United States Patent [19]
Yoshida et al.

[11] Patent Number: 6,130,757
[45] Date of Patent: *Oct. 10, 2000

[54] CLIENT-SERVER SYSTEM WITH EFFECTIVELY USED SERVER FUNCTIONS

[75] Inventors: Akinori Yoshida, Nishio; Katsuhisa Toyama, Toyokawa; Naohiro Yonezu, Toyohashi, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/859,966

[22] Filed: May 21, 1997

[30] Foreign Application Priority Data

| May 21, 1996 | [JP] | Japan | 8-125989 |
| May 21, 1996 | [JP] | Japan | 8-125990 |

[51] Int. Cl.⁷ .................................................. B41B 15/00
[52] U.S. Cl. .......................................... 358/1.15; 358/1.14
[58] Field of Search ....................................... 395/114, 113, 395/200, 112; 358/1.13, 1.14, 1.15

[56] References Cited

U.S. PATENT DOCUMENTS

| 3,920,895 | 11/1975 | Vieri et al. | 178/26 R |
| 4,167,332 | 9/1979 | Yano et al. | 355/3 R |
| 4,797,706 | 1/1989 | Sugishima et al. | 355/14 R |
| 4,864,417 | 9/1989 | Watanabe et al. | 358/296 |
| 4,947,345 | 8/1990 | Paradise et al. | 364/519 |
| 5,206,735 | 4/1993 | Gauronski et al. | 358/296 |
| 5,371,873 | 12/1994 | Niwa | 395/425 |
| 5,615,015 | 3/1997 | Krist et al. | 358/296 |
| 5,619,649 | 4/1997 | Kovnat et al. | 395/200.01 |
| 5,625,757 | 4/1997 | Kageyama et al. | 395/113 |
| 5,718,520 | 2/1998 | MacKay | 400/61 |
| 5,778,183 | 6/1998 | Filion et al. | 395/200.53 |
| 5,790,119 | 8/1998 | Sklut et al. | 345/349 |

FOREIGN PATENT DOCUMENTS

| 0473017 | 4/1992 | European Pat. Off. . |
| 62-51867 | 6/1987 | Japan . |

Primary Examiner—Bhavesh Mehta
Attorney, Agent, or Firm—Sidley & Austin

[57] ABSTRACT

In a network system being composed of server apparatuses and a client apparatus, the client apparatus requests the server apparatuses to publish functions they can provide by using the function information requesting unit, receives information on such functions from the server apparatuses by using the function information receiving unit, generates the guidance menu based on the received information by using the guidance menu generating unit, and displays the guidance menu by using the displaying unit. Each server apparatus manages jobs requested by the client apparatus by assigning priorities to the jobs by using the job management unit, and searches a job having the highest priority at intervals and executes the job by using the job controlling unit.

21 Claims, 26 Drawing Sheets

FIG. 6

| AREA | JOB | PAGE | FORWARD CONNECTION | BACKWARD CONNECTION | ADDITIONAL INFORMATION |
|---|---|---|---|---|---|
| 00 | 1 | 1 | 00 | 01 | |
| 01 | 1 | 1 | 01 | FF | |
| 02 | 1 | 2 | 00 | 03 | |
| 03 | 1 | 2 | 03 | FF | |
| 04 | 2 | 1 | 00 | 05 | |
| 05 | 2 | 1 | 05 | FF | |
| 06 | 2 | 2 | 00 | 07 | |
| 07 | 2 | 2 | 07 | FF | |
| ... | | | | | |

| JOB ID | JOB TYPE | CLIENT | APPLICA-TION | PRIORITY | OPERATION INSTRUCTION INFORMATION |
|---|---|---|---|---|---|
| 1 | FUNCTION SEARCH | 3F COPYING MACHINE | | 0 | |
| 2 | PRINT | 1F FACSIMILE | COPY | 4 | |
| 3 | IMAGE EDITING | 3F COPYING MACHINE | COPY | 3 | |
| 4 | PRINT | | FACSIMILE | 6 | |
| 5 | PRINT | | COPY | 1 | |
| 6 | TELEPHONE NUMBER SEARCH | 1F COPYING MACHINE | FACSIMILE | 0 | |
| 7 | FACSIMILE TRANSMISSION | 1F COPYING MACHINE | FACSIMILE | 8 | |
| 8 | PRINT | LOCAL PC | PRINTER | 5 | |
| ⋮ | | | | | |

| JOB ID | PRIORITY | REGISTERED TIME | JOB STATUS | ADDITIONAL INFORMATION |
|---|---|---|---|---|
| 2 | 4 | 7:58 | SUSPENDED | |
| 4 | 6 | 8:05 | WAITING | |
| 5 | 1 | 8:11 | IN PRINTING | |
| 8 | 5 | 8:15 | WAITING | |
| ⋮ | | | | |

| JOB ID | PRIORITY | REGISTERED TIME | JOB STATUS | ADDITIONAL INFORMATION |
|---|---|---|---|---|
| 7 | 8 | 8:17 | WAITING | |
| 9 | 7 | 8:20 | IN TRANSMISSION | |
| 12 | 8 | 8:25 | WAITING | |
| 14 | 8 | 8:30 | WAITING | |
| ⋮ | | | | |

FIG. 17

| APPLICATION | FUNCTION GROUP | FUNCTION | FUNCTION PARAMETER | OPERATION INSTRUCTION INFORMATION |
|---|---|---|---|---|
| APPLICATION 1 | FUNCTION GROUP 1 | FUNCTION 1 | SET RANGE | |
| | | FUNCTION 2 | SET RANGE | |
| | FUNCTION GROUP 2 | FUNCTION 3 | SET RANGE | |
| | FUNCTION GROUP 3 | FUNCTION 4 | SET RANGE | |
| | FUNCTION GROUP 4 | | | |
| APPLICATION 2 | | | | |
| APPLICATION 3 | | | | |

FUNK

| JOB ID | SERVER | SERVER JOB ID | JOB TYPE | APPLICATION | POST-PROCESSING | OPERATION INSTRUCTION INFORMATION |
|---|---|---|---|---|---|---|
| 1 | 3F COPYING MACHINE | 1 | COPY | COPY | JOB COMPLETION REPORT | |
| 2 | 1F FACSIMILE | 1 | FACSIMILE TRANSMISSION | FACSIMILE | NONE | |
| 3 | 3F COPYING MACHINE | 2 | IMAGE EDITING | COPY | IMAGE PRINTING | |
| 4 | 1F COPYING MACHINE | 1 | COPY | COPY | JOB COMPLETION REPORT | |
| 5 | 2F FACSIMILE | 1 | FACSIMILE TRANSMISSION | FACSIMILE | NONE | |
| ⋯ | | | | | | |

CLIENT-SERVER SYSTEM WITH EFFECTIVELY USED SERVER FUNCTIONS

BACKGROUND OF THE INVENTION (1) Field of the Invention

This invention relates to a client-server system, and more specifically to a network which is composed of client apparatuses and server apparatuses, which are connected to the client apparatuses and execute jobs at the request of the client apparatuses.

(2) Description of the Prior Art

As office automation is improved, client server systems have become popular. Client-server systems are networks being composed of interconnected client and server terminals, the client and server terminals being copying machines, facsimile machines, etc. In such client-server systems, it is possible for a client terminal to request a server terminal to execute a job. Such a construction achieves effective use of the terminals in the network.

Japanese Laid-Open Patents 60-123152 and 60-123153, for example, disclose client-server systems being networks composed of a plurality of client apparatuses such as personal computers (hereinafter PCs) and a plurality of server apparatuses such as printers, the client and server apparatuses being connected to each other via dedicated controllers such as switches.

In such conventional client-server systems, the PCs as client apparatuses load in advance programs for monitoring the state of the printers as server apparatuses so that the PCs can display on their displays information on an output-destination printer specified by the operator, the information including the range of the magnification/reduction of character size in printing, printer state, paper size, number of stocked sheets of paper, paper jam detection, etc. Operators of the PCs can request the server apparatuses to execute jobs based on the displayed information.

With such a construction, however, the PCs must load, beforehand, programs respectively suitable for the server apparatuses. Accordingly, it is troublesome for the operators of the PCs to get information on the apparatuses and the functions the apparatuses provide if the server apparatuses are located in remote places or if the network includes a lot of server apparatuses. Accordingly, such a system tends to cause a problem that a function of a server apparatus cannot be used by a client apparatus, even if the server apparatus is connected to the client apparatus in the network, since the function has not been registered. Such a case may be a hindrance for effective use of the network.

It is comparatively easy for the client apparatuses to register a new terminal as a server apparatus as far as the terminal includes only conventional functions. It often happens, however, that a newly developed terminal is connected to the network and the terminal has new functions not supported by conventional terminals. When this happens, the client apparatuses are required to load a new program which can deal with the new functions under a suitable format. Such a program often displays the new functions of the server apparatuses on the screen, enabling the operator to request jobs based on the new format.

On the other hand, the server terminals receive a lot of jobs requested by the client terminals. Therefore, the server terminals are required to manage jobs requested by client terminals. For such management, it is desirable that each job is given an appropriate priority. Japanese Laid-Open Patents 4-233555 discloses a system in which server terminals are connected to client terminals via a dedicated controller (e.g., a switch). The operator manually operates the dedicated controller to determine the priorities of the jobs. The jobs are executed based on the priorities and order of reception.

If the operator, for example, during an execution of a print job, wishes to execute another higher-priority print job under such a construction, the operator is required to manually operates, the dedicated controller or to input an interrupt instruction. The current print job is suspended while the higher-priority print job is executed, and after the interrupting print job is executed, the suspended print job is resumed.

However, such a manual operation of the controller is troublesome, especially when it is hard to grasp the status of the target server terminal since the client terminal is remote from the target server terminal. Furthermore, the above system may be said to be unsuccessful in managing jobs effectively since the operator must wait until the resumed print job is finished or, alternatively, press a switch when the operator wishes, during the execution of the resumed print job, to execute another higher-priority print job immediately.

SUMMARY OF THE INVENTION

It is therefore the first object of the present invention to provide a client-server system in which a client apparatus is able to easily realize the functions provided by the server apparatuses in the client-server system, and to provide a client-server system in which such functions can be used by the client apparatus without updating programs for dealing with such functions.

It is the second object of the present invention to provide a client-server system which reduces the troubles of the operators of the server apparatuses, achieving optimum processing by improving the interrupt handling process.

The first object is achieved by a client apparatus, connected to a plurality of server apparatuses in a network, for requesting an arbitrary server apparatus of the plurality of server apparatuses to execute a job, the client apparatus comprising: a function information requesting unit for requesting each of the plurality of server apparatuses in the network to send information on the functions which can be provided by each of the plurality of server apparatuses; a function information receiving unit for receiving the information on the functions sent from each of the plurality of server apparatuses; a guidance menu generating unit for generating a guidance menu based on the information received by the function information receiving unit; and a displaying unit for displaying the guidance menu generated by the guidance menu generating unit.

In the above client apparatus, the information publication requesting unit may send either of a first request and a second request to each of the plurality of server apparatuses according to an instruction by the user, wherein the first request requests each of the plurality of server apparatuses in the network to send information on the functions which can be provided by each of the plurality of server apparatuses, and the second request requests each of the plurality of server apparatuses in the network to send information on certain functions.

With such a construction, the operator of the client apparatus can realize the functions provided by the server apparatuses in the network. It is also possible for the operator to appropriately request jobs to the server apparatuses without updating the program, even if a new server apparatus with a new function is connected to the network.

The second object is achieved by a server apparatus, connected to a plurality of client apparatuses in a network, for executing a job requested by the plurality of client apparatuses, the server apparatus comprising: a job management unit for managing jobs requested by the plurality of client apparatuses by assigning priorities to the jobs each time a job is requested; and a job controlling unit for searching a job having the highest priority at intervals and executing the job.

With such a construction, the priorities are automatically assigned to the jobs each time a job is requested, and a job having the highest priority is executed immediately. That is, interrupt jobs are automatically executed without manual operations by the operator. The priorities of the jobs are checked at certain intervals. Therefore, a job may be replaced by another job having the highest priority after a certain interval and jobs to be executed change based on the priorities, achieving optimum processing by improving the interrupt handling process.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6 shows a construction of the memory management table of a copying machine;

FIG. 8 shows a construction of server job management table JT(a);

FIG. 10 shows a construction of print job table PT;

FIG. 11 shows a construction of facsimile transmission job table FT;

FIG. 17 shows a function management table;

FIG. 20 shows a construction of client job management table JT(b);

DESCRIPTION OF THE PREFERRED EMBODIMENTS

Figure 1:
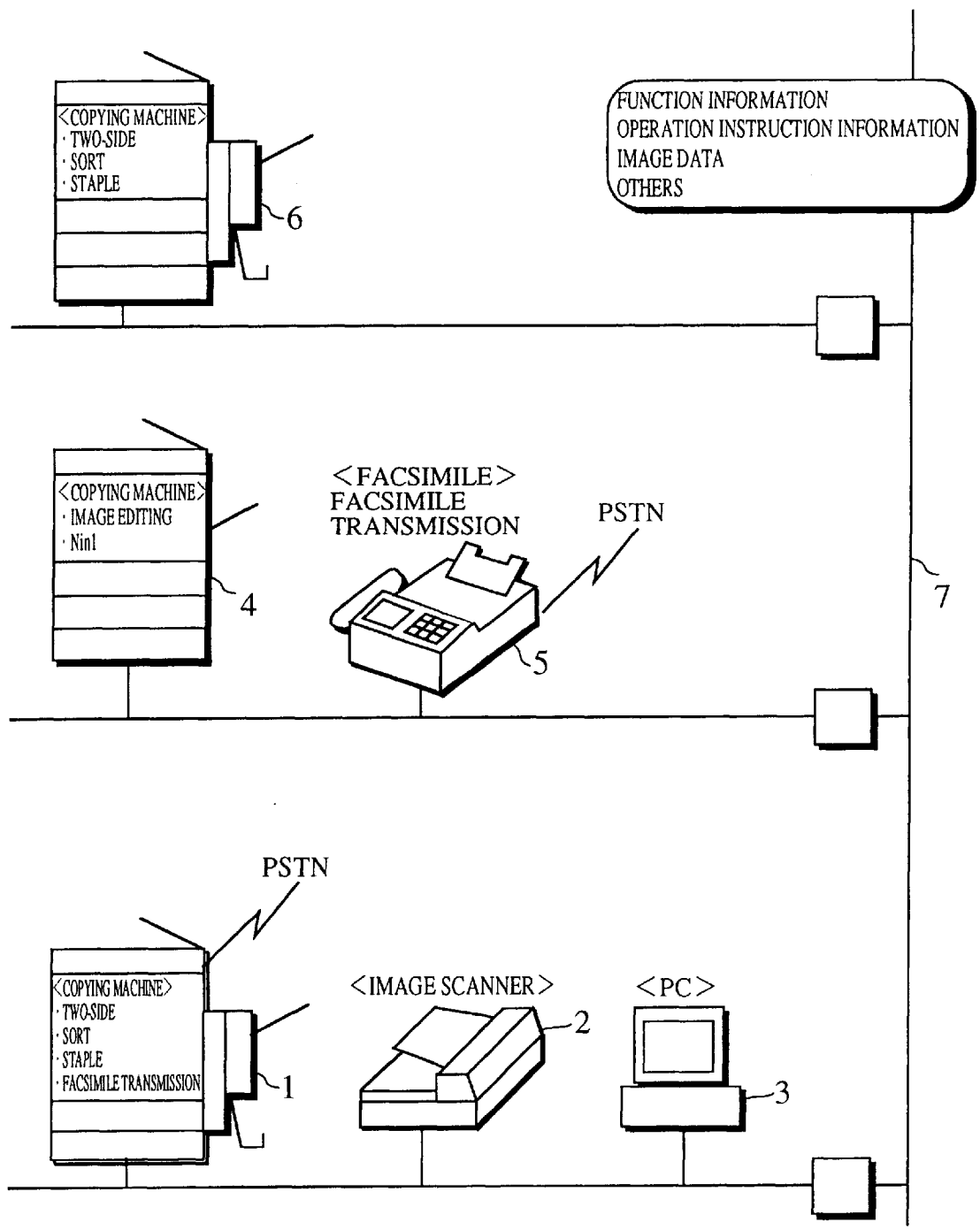
FIG. 1 is a network system of the present invention.

FIG. 1 shows a network system of the present embodiment which is formed in an office building. As shown in the drawing, copying machine 1, image scanner 2, and PC 3 are set on the first floor of the building, copying machine 4 and facsimile machine 5 on the second floor, and copying machine 6 on the third floor. All these machines are connected to each other via transmission path 7 to construct a Local Area Network system (LAN).

Each of copying machines 1, 4, and 6 includes such functions as image reading, image processing with which read images are edited, and printing. Copying machine 1 further includes a facsimile transmission function and a facsimile receiving function.

Copying machines 1, 4, and 6, image scanner 2, PC 3, and facsimile machine 5 provide, as server apparatuses, their functions to other apparatuses in the network. Copying machines 1, 4, and 6, for example, execute print jobs or facsimile transmission jobs when such functions are requested by other apparatuses. Similarly, copying machine 1 provides a two-side copying function, a sorting function, a stapling function, and a facsimile transmission/reception function; copying machine 4 provides an image editing function and a Nin1 copying function; and copying machine 6 provides a two-side copying function, a sorting function, and a stapling function, where the Nin1 copying function is used for copying a plurality of images an a sheet of paper.

On the other hand, each of copying machines 1, 4, and 6 is also used as a client apparatus for requesting other server apparatuses to execute jobs such as print jobs and facsimile transmission jobs. Accordingly, it is possible, for example, for copying machine 4, as a client apparatus, to read and send an image to copying machine 1 with a job request, and for copying machine 1, as a server apparatus and having received the job request, to print the image or send the image by facsimile.

The following is a description of the construction of copying machine 1. Copying machines 1, 4, and 6 are constructed almost the same, except that copying machine 1 has additional has elements for performing the facsimile transmission/reception function.

Figure 2:
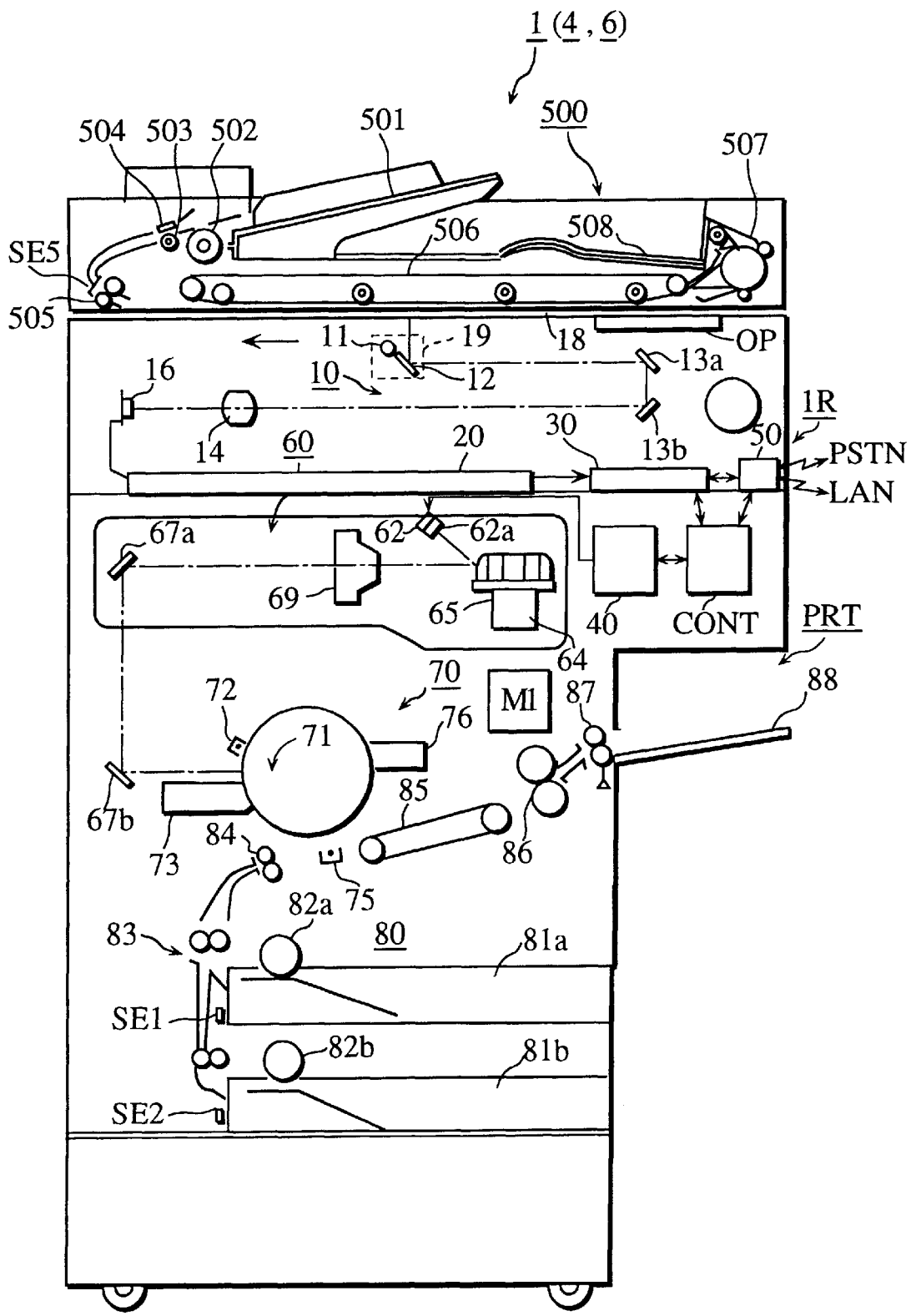
FIG. 2 shows the construction of a copying machine.

FIG. 2 shows the construction of copying machine 1. As shown in the drawing, copying machine 1 includes image reading unit IR and printer unit PRT. Image reading unit IR includes memory unit 30, external input/output controlling unit 50, operation panel OP, and Automatic Document Feeder (ADF) 500 for automatically feeding documents. Printer unit PRT includes controlling unit CONT for controlling each unit, automatic two side printing unit DUP (not shown in the drawings) for printing images on two sides of paper, finisher unit FIN (not shown in the drawings) for sorting, stapling, and punching printed paper.

ADF 500 attached to image reading unit IR is composed of document tray 501, pick-up roller 502, feed roller 503, friction pad 504, register roller 505, transport belt 506, inverting roller 507, and reception tray 508. With such a construction, a document in document tray 501 is automatically transported onto a certain position on document glass plate 18 sheet by sheet, is then read and automatically ejected into reception tray 508. Document size detecting sensor SE5 fixed near register roller 505 detects the document size immediately before a sheet of document paper is transported onto document glass plate 18. The detected size is input to controlling unit CONT which controls ADF 500. In two-side printing, after one side of the sheet of document paper is read, the sheet returns to the same position on document glass plate 18 after being inverted by circling inverting roller 507. For this purpose, transport belt 506 can move in either direction, forward and backward.

Reading system 10 of image reading unit IR includes exposure lamp 11, first mirror 12, second mirror 13*a*, third mirror 13*b*, converging lens 14, photoelectric transfer device 16, and scan motor. With such a construction, a side of a document sheet on document glass plate 18, is read by photoelectric transfer device 16. The image of the read sheet is sent to image data processing unit 20 as one page of image signals. Image data processing unit 20 converts from analog to digital the image signals received from reading system 10. Image data processing unit 20 then corrects the image data in terms of the picture quality such as shading, MTF, gamma, etc. Image data processing unit 20 also magnifies or edits the image according to instructions from controlling unit CONT.

Memory unit 30 temporarily stores such data as: image data read by the reading unit, image data requested to be processed by another apparatus via external input/output controlling unit 50, and image data received by facsimile. The construction of memory unit 30 is described later.

When the image data stored in memory unit 30 is printed, print processing unit 40 of printer unit PRT lets semiconductor laser 62 of optical system 60 scan the image data, in the main scanning direction. The laser beam emitted from semi-conductor 62 is deflected by polygon mirror 65. The deflected laser beam pass through fφ lens 69, then is led to photosensitive drum 71 of image creating system 70 by mirrors 67*a* and 67*b*.

Photosensitive drum 71 rotates in the direction as shown in FIG. 2 (anticlockwise), and the surface of photosensitive drum 71 is cleaned by cleaner 76 to remove residue toner before receiving the laser beam and the surface is charged uniformly by electrostatic charger 72. An electrostatic latent image is formed by exposing the surface of photosensitive drum 71 to the laser beam under the above condition. Developing unit 73 develops the electrostatic latent image on photosensitive drum 71.

Sheet size detecting sensors SE1 and SE2 set in appropriate positions in sheet transport path 83 of transporting system 80 send detection signals so that a sheet of paper of the detected size is picked up from feeding cassettes 81*a* and 81*b* and that the sheet of paper is transported to transfer charger 75 of photosensitive drum 71 through rollers 82*a* and 82*b*, sheet transport path 83, and timing roller 84. The developed electrostatic latent image is transferred to the sheet of paper by transfer charger 75.

The toner image transferred to the sheet of paper is under an unstable condition, that is, the toner image would easily come off even with a light touch. Therefore, the sheet of paper with the toner image is sent to toner fixing unit 86 by transport belt 85 to be pressed while heating. After the toner is fixed onto the sheet of paper by pressing and heating, the sheet of paper is ejected onto reception tray 88 via ejecting roller 87.

External input/output controlling unit 50 requests the other apparatuses in the network to publish their functions and receives the published information from the apparatuses so that the operator understands the functions the other terminals provide. External input/output controlling unit 50 also requests the other apparatuses in the network to send information on the formats required for requesting the functions and receives the information. External input/output controlling unit 50 sends operation specification information to the other terminals, the operation specification information specifying a job requested to be executed, conforming to the format. External input/output controlling unit 50 also receives the operation specification information from the other terminals. The construction of external input/output controlling unit 50 is described later.

Figure 3:
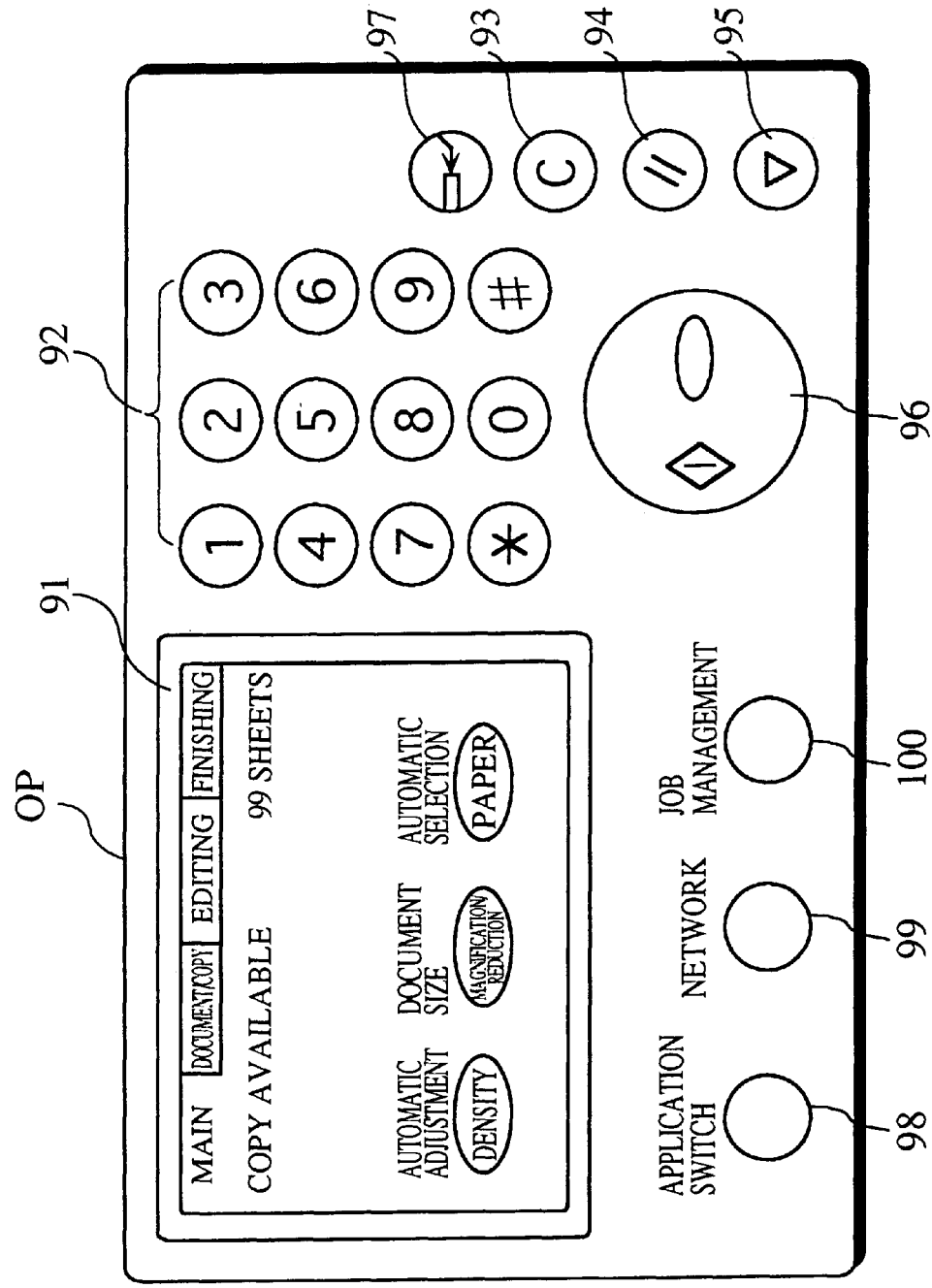
FIG. 3 is a top view of an operation panel.

FIG. 3 is a top view of the operation panel. Operation panel OP includes crystal touch panel 91, which is formed by piles of crystal panels and touch panels, and a plurality of operation keys. Controlling unit CONT receives instructions input from operation panel OP and controls lighting of light emitting diodes (LEDs) of the operation keys and screens displayed on crystal touch panel 91.

The operation keys are composed of ten keys 92, clear key 93, panel reset key 94, stop key 95, start key 96, interrupt key 97, application switch key 98, network key 99, and job management key 100. Ten keys 92 are used to set values such as the number of copies, magnification rate, telephone numbers as facsimile transmission destinations, etc. Clear key 93 is used to reset the set values to standard values, such as "1." Panel reset key 94 is used to reset the set values in the copying machine to standard values. Stop key 95 is used stop an operation. Start key 96 is used to start an operation. Interrupt key 97 is used to issue an interrupt request to execute another job. Application switch key 98 is used to switch applications and accordingly to change screens displayed on crystal touch panel 91. Note that "applications" indicate upper functions each of which is composed of a plurality of lower functions.

Network key 99 is used when the operator attempts to use the functions of other terminals in the network with copying machine 1 used as a client terminal or when the operator registers the functions of copying machine 1 as a server terminal. Job management key 100 is mainly used to manage the job in execution and the jobs in queue when copying machine 1 operates as a server terminal. Inputting from network key 99 and job management key 100 is described later.

Crystal touch panel 91 may display the status of copying machine 1 such as the exposure level, magnification rate, and paper size and may display the state of facsimile operation such as the facsimile transmission destination and the transmission mode. Crystal touch panel 91 may also display the occurrence of errors such as paper jam, need for calling a service person, and paper empty. It is also possible for the operator to input information from crystal touch panel 91.

Crystal touch panel 91 also displays a guidance menu and a format menu. The guidance menu includes locations of the other apparatuses, functions provided by the apparatuses, etc. The format menu shows the formats required for requesting jobs like print jobs. The guidance menu and the format menu are described in detail later in terms of contents of display, the operations, and the like.

Figure 4:
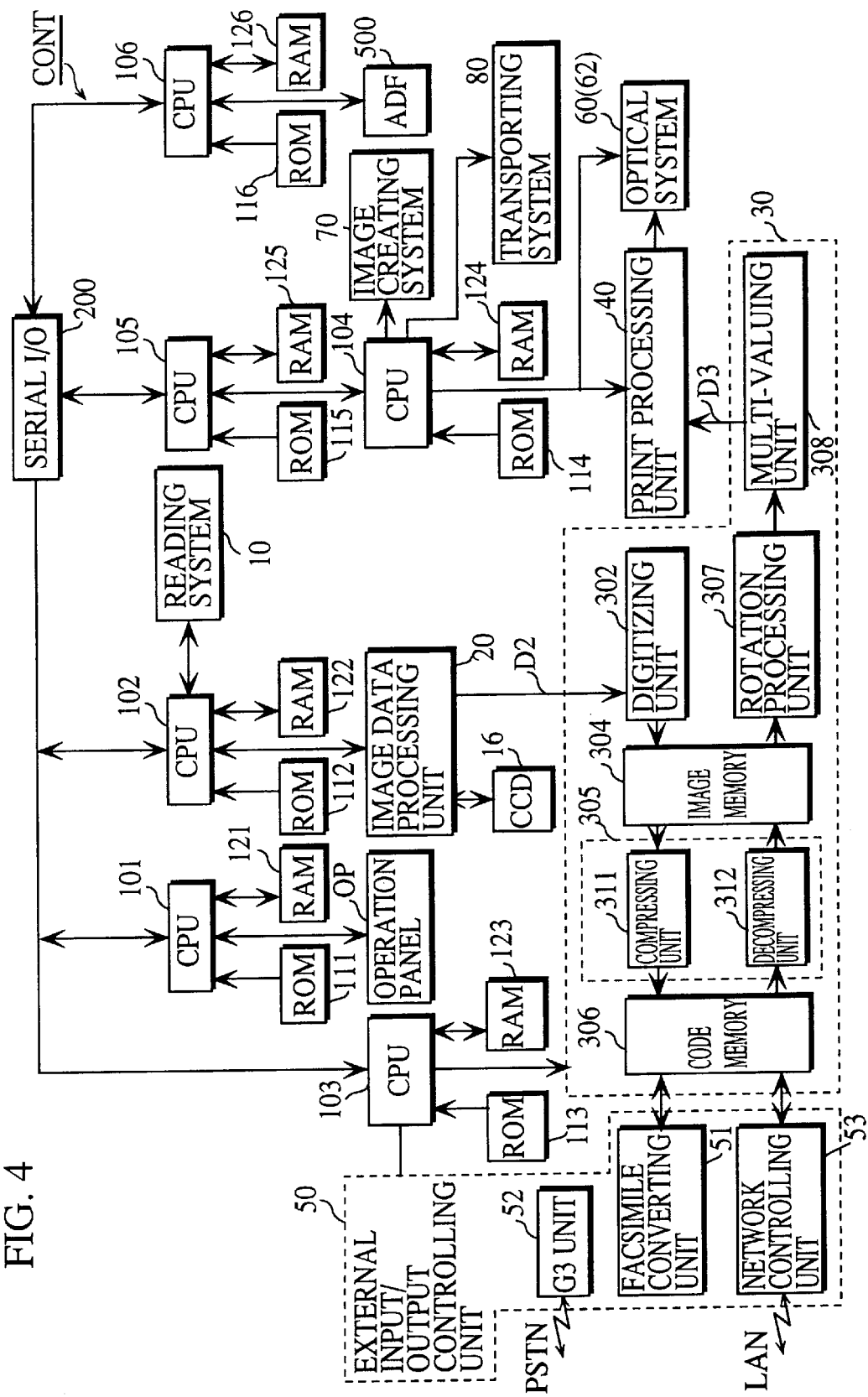
FIG. 4 is a block diagram showing the hardware construction of the controlling system of an copying machine.

FIG. 4 is a block diagram showing the hardware construction of the controlling system including controlling unit CONT. As shown in the drawing, controlling unit CONT is constructed around CPUs 101–106. Each of CPUs 101–106 is connected to a pair of a ROM among ROMs 111–116 and a RAM among RAM 121–126, ROM 111–116 storing necessary programs, and RAMs 121–126 being used as work areas when the programs run. CPUs 101–106 operate independently, based on the programs stored in ROMs 111–116, by sending/receiving information by unit of interrupt requests to/from each other via serial I/O 200.

CPU 101 for operation panel OP receives key inputs from the operation panel, controls the lighting of LEDs, generates information to be displayed on crystal touch panel 91 as information concerning terminal names, functions, and requesting formats, and manages the jobs requested from other terminals. CPU 101 for operation panel OP is described in detail later.

CPU 102 for image processing controls the operation of reading system 10 of image reading unit IR, controls each unit of image data processing unit 20, and stores the read image data into memory unit 30.

CPU 103 for memory unit 30 controls memory unit 30 and external input/output controlling unit 50. More specifically, CPU 103 stores the image data, which is requested by another apparatus via external input/output controlling unit 50, into memory unit 30. CPU 103 reads the image data from memory unit 30 and instructs print processing unit 40 to output the image data to execute printing. CPU 103 also instructs facsimile converting unit 51 to output the image data to execute a facsimile transmission. CPU 103 instructs external input/output controlling unit 50 to output the image data to send the image data to another apparatus for a requested job. CPU 103 for memory unit 30 is also described in detail later.

Master CPU 104, according to instructions from CPU 103, receives signals detected by sheet size detecting SE1 and SE2 of printer unit PRT, prints the image onto the paper by controlling print processing unit 40, optical system 60, image creating system 70, and transporting system 80.

CPU 105 for timing adjustment helps controlling unit CONT adjust timing and set operation modes. More specifically, CPU 105 controls the operation of copying machine 1 by issuing the start or stop command to other CPUs and setting the operation modes of the other CPUs.

CPU 106 for document transporting, according to instructions from CPU 105, transports a sheet of document paper from document tray 510 of ADF 500 to a certain position on document glass plate 18 and ejects the sheet to reception tray 508 after the sheet is read. CPU 106 also detects the document size based on the ON/OFF time of sensor 50 of document transporting unit 500 when transporting a sheet of document paper to document glass plate 18, and sends the detection result to CPU 105. CPU 105 receives and stores the detected document size into job management tables JT(a) and JT(b) (described later) as operation instruction information.

Now, the construction of memory unit 30 is described with reference to FIG. 4. Memory unit 30 is composed of digitizing unit 302, image memory 304, code memory 306, rotation processing unit 307, multi-valuing unit 308, compressing unit 311, and decompressing unit 312.

Figure 5:
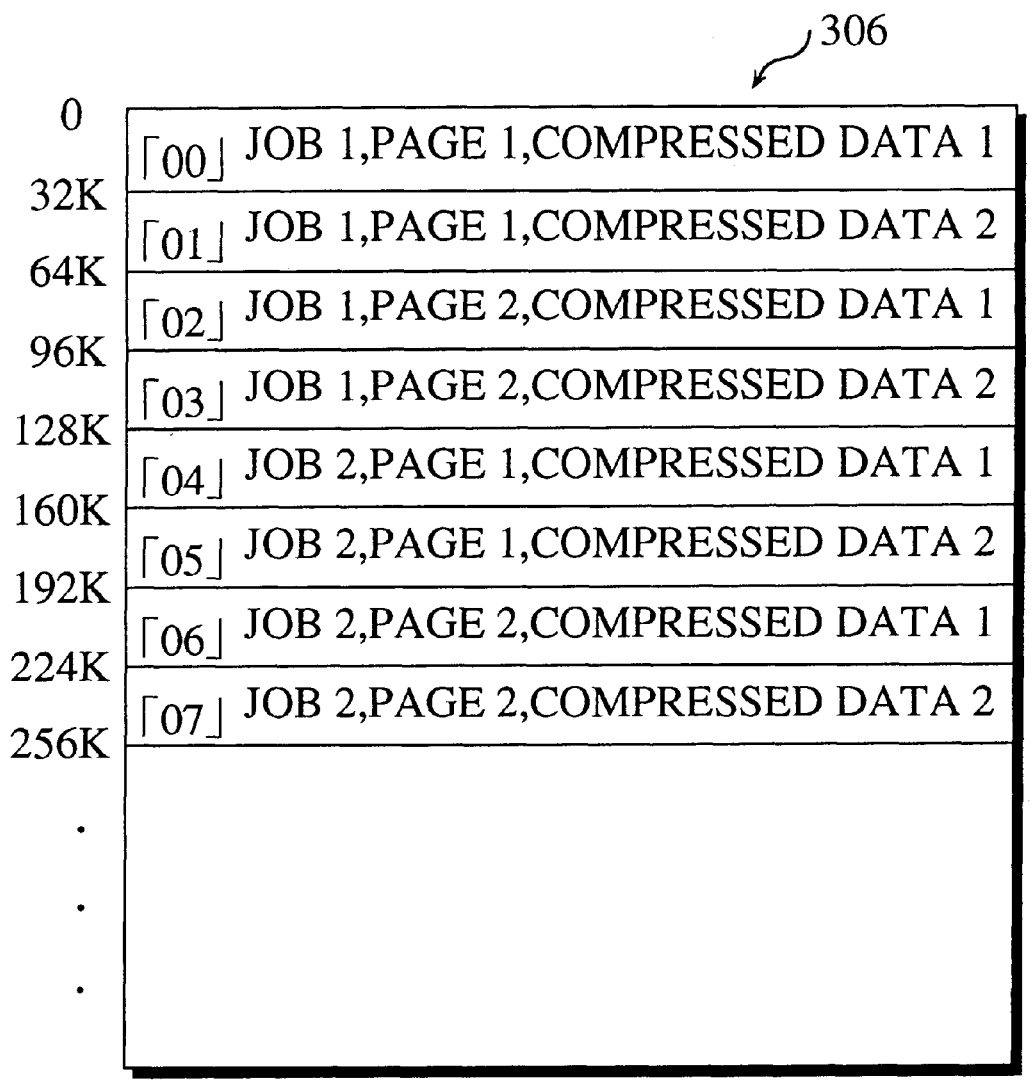
FIG. 5 shows the code memory of a copying machine.

When the document is read, a page of image data D2 is transferred from image data processing unit 20 to digitizing unit 302. Digitizing unit 302 digitizes the image data D2 and stores the digitized image data into image memory 304. The digitized image data is then compressed by compressing unit 311 and is stored into code memory 306 as compressed image data. Image data sent from another apparatus with a request that the image data is processed by copying machine 1 is directly stored into code memory 306. Code memory 306 is divided into a plurality of 32 KB-areas (FIG. 5). Each area stores image data with consideration so that the reading and writing can be controlled simultaneously.

Code memory 306 is managed based on the memory management table which is created by CPU 103 and stored in RAM 123. The memory management table, as shown in FIG. 6, includes the area serial number, job serial number, page number, forward and backward connected areas, and additional information such as compression method and data length which are required for compressing or decompressing data. The memory management table is used to dynamically manage code memory 306. Note that "FORWARD CONNECTION" in the management table indicates an area connected to the current area in the forward direction or whether the current area is the first area. If FORWARD CONNECTION is "00," for example, it indicates that the current area is the first area. Otherwise it indicates an area connected to the current area in the forward direction. Similarly, "BACKWARD CONNECTION" indicates an area connected to the current area in the backward direction or whether the current area is not connected in the direction. If BACKWARD CONNECTION is "FF," for example, it indicates that the current area is the last in the series and not connected to another area in the backward direction. Otherwise it indicates an area connected to the current area in the backward direction.

For printing, the image data is read from code memory 306, decompressed by decompressing unit 312, and written into image memory 304 as decompressed image data. The image data in image memory 304 is transferred to print processing unit 40 via rotation processing unit 307 and multi-valuing unit 308. The image data in print processing unit 40 is recognized as a print target and is formed on photosensitive drum 71 as an electrostatic latent image by optical system 60.

The image data is read from code memory 306 and is sent to facsimile converting unit 51 and network controlling unit 53 of external input/output controlling unit 50 when the image data is used for a job requested to another terminal or when the image data is sent by facsimile.

Now, external input/output controlling unit 50 is described with reference to FIG. 4. External input/output controlling unit 50 is composed of facsimile converting unit 51, G3 unit 52, and network controlling unit 53. Facsimile converting unit 51 transmits/receives image data to/from memory unit 30 for facsimile transmissions. Facsimile converting unit 51 also converts the pixel densities and the coding methods.

G3 unit 52 controls communications when encoding or decoding image data during facsimile transmission/reception in Public Switched Telephone Network (PSTN). Network controlling unit 53 is connected to transmission path 7 (FIG. 1), and transmits/receives a function, a format, and an image which are used in a requested job.

Copying machine 1, as constructed above, can execute three applications, namely, the copy application which is a combination of image processing and printing, the print application using only the print function, and the facsimile application which is a combination of the facsimile receiving function and the image reading function, and the print function.

Copying machine 1, as a client terminal, requests another terminal to send information on the functions the terminal can provide or the formats required for requesting such functions from and the terminal to request the terminal to execute all or a part of the functions. Copying machine 1 can then request such functions with appropriate formats. Copying machine 1, as a server terminal, can also execute jobs requested by other terminals for each application.

The above functions as a client terminal are mainly managed by CPU 101; the above functions as a server terminal are mainly managed by CPU 103. The operator input instructions concerning the client/server functions from crystal touch panel 91.

Now, the operation of CPU 101 and CPU 103 for copying machine 1 as a client/server terminal is described.

Figure 7:
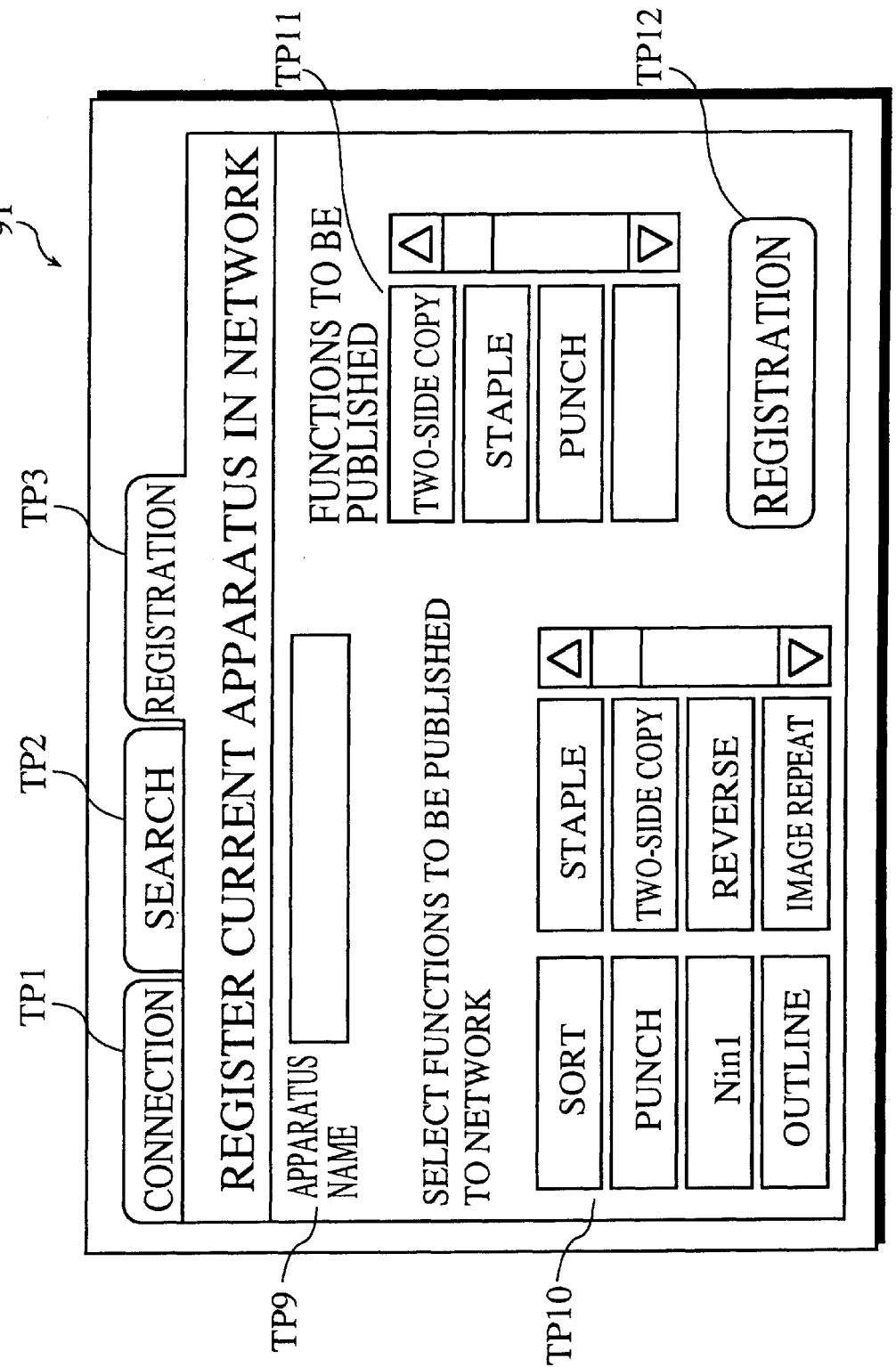
FIG. 7 shows a network register screen for display on the operation panel of FIG. 3.

To operate as a server terminal in the network, copying machine 1 must notify the other apparatuses of the functions it can provide. CPU 101 creates the network register screen as shown in FIG. 7 which is used for registering the functions in the network. The network register screen is created by CPU 101 and displayed on crystal touch panel 91 when the operator presses network key 99 shown in FIG. 3 then registration key TP3. On the screen, the operator can select and register functions the operator intends to provide for the network.

The operator registers a function by selecting the function from TP10 and letting the function appear in a column of TP11 and pressing TP12. The selected function is recorded ==in RAM 121. When another apparatus requests the publication of the functions copying machine 1 provides (in FIG. 7, the functions are the two-side copying, stapling, and punching), CPU 101 reads the functions recorded in RAM 121 and publishes the functions. That is to say, CPU 101 functions as a function notifying unit. The operator inputs information into TP9 as shown in FIG. 7 for identifying copying machine 1, such as "1F" representing the location and "copying machine/FAX" representing the name. The other client terminals use the name input in TP9 to identify copying machine 1. The other terminals also have this function.

Along with the functions, the formats required for the functions are also recorded. A format is sent to another client terminal when the terminal requests a job. That is, CPU 101 also functions as a format notifying unit.

The following is a description when copying machine 1 operates in reality as a server terminal. Note that when copying machine 1 functions as a server terminal, copying machine 1 may request copying machine 1 itself to execute a job. Such jobs requested by the current apparatus are called local jobs; jobs requested by other apparatuses are called network jobs. Since image reading unit IR, printer unit PRT, and facsimile transmitting unit operate asynchronously, these units can operate in parallel. Therefore, the local and network jobs are required to be managed for each of image reading unit IR, printer unit PRT, and the facsimile transmitting unit.

However, since jobs for reading a document in copying or facsimile transmissions are executed at very high speed and end in shorter times, these jobs are not registered and are executed as the jobs are generated. On the other hand, print jobs or facsimile transmission jobs comparatively take time. Therefore, such jobs are registered along with the images.

The network jobs and the local jobs are managed based on server job management table JT(a), print job table PT, facsimile transmission job table FT which are created by CPU 103 and stored in RAM 123. That is, CPU 103 functions as a job managing unit.

FIG. 8 shows the construction of server job management table JT(a). Server job management table JT(a) is created by CPU 103 and is stored in RAM 123 when an instruction for executing a local job is input from operation panel OP of copying machine 1 or when a network job is requested by another terminal via network controlling unit 53. As described earlier, server job management table JT(a) manages jobs which do not include image reading jobs. Server job management table JT(a), as shown in FIG. 8, includes job IDs, job types, client names, application names, priorities, and operation instruction information. CPU 103 executes jobs according to the priorities shown in server job management table JT(a), and delete jobs from the table if the jobs have been completed.

A job ID is an identification number of each job. Each job ID is related to a job number in the memory management table shown in FIG. 6. The job type shows job types such as function searching, printing, image editing, telephone number searching, facsimile transmitting, etc. The client names indicate the names of apparatuses (for example, copying machines at 3F and 1F, and a local PC) which requested the network jobs. The blank columns indicate that the jobs are local jobs.

The priorities indicate the priorities of job execution.

In the present embodiment, smaller numbers indicate higher priorities. The initial values for the priorities are as follows: "0" for network search jobs, "1" for single copies by local copy applications, "2" for other local copies, "3" for network image editing jobs, "4" for network print jobs, "5" for local printer applications, "6" for local facsimile application transmitting jobs, "7" for receiving jobs, and "8" for network facsimile transmission jobs.

Figure 9:
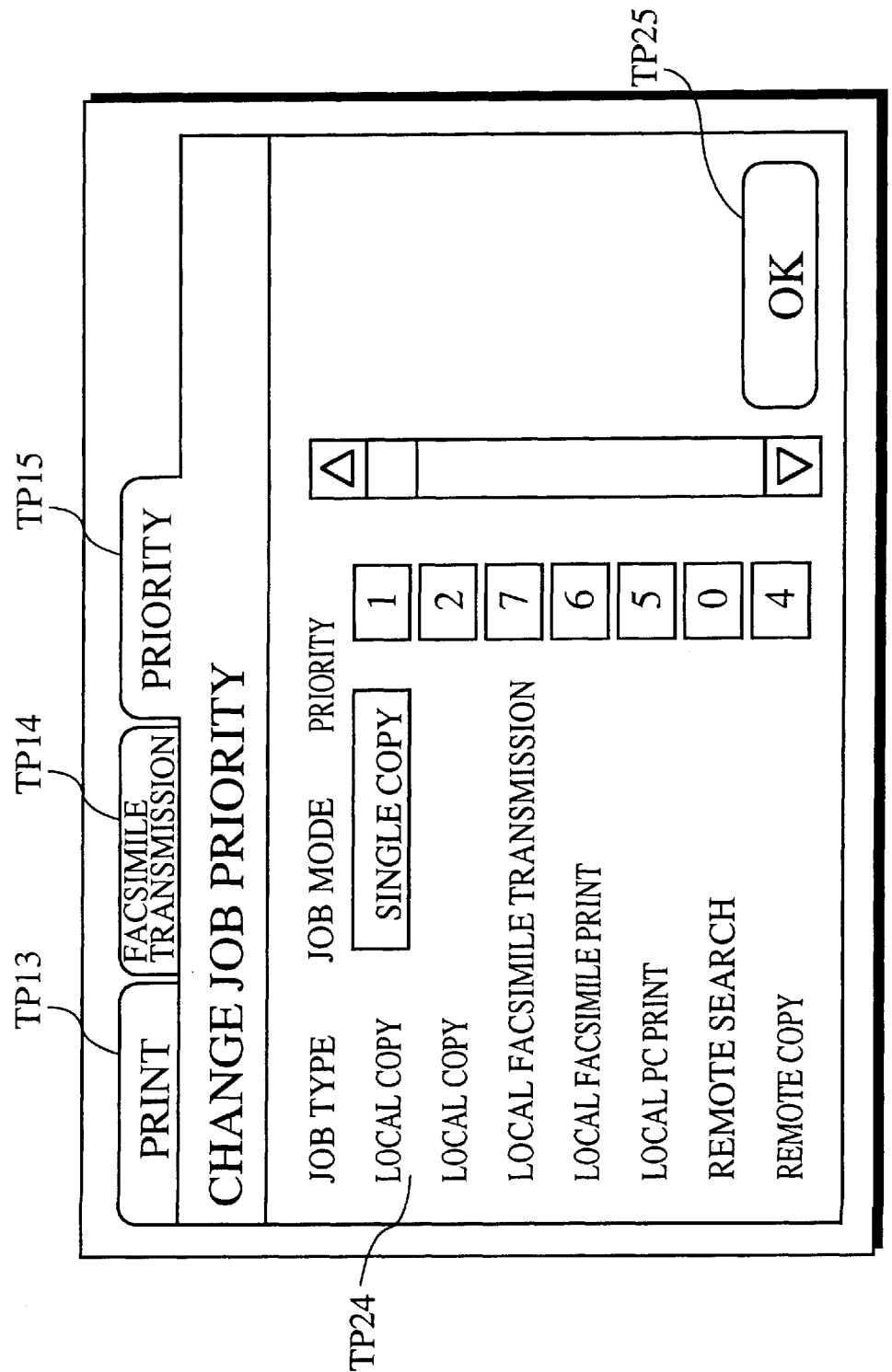
FIG. 9 shows a job priority setting screen for display on the operation panel of FIG. 3.

Note that the operator can change the priorities according to the user environment. FIG. 9 shows the priority setting screen. The screen is read by CPU 101 and is displayed on crystal touch panel 91 when the operator presses job management key 100 on operation panel OP then TP15 on crystal touch panel 91. The operator selects a job from TP24 whose priority is to be changed, changes the priority value, and determines the value by pressing TP25. In this way, the user can change the priorities according to the user environment.

Referring to FIG. 8, operation instruction information indicates operations which are available for each job type. The operations are, for example, number of sheets in a document, number of sheets to be printed, size for printing/transmitting, image data format (compressed/non-compressed), facsimile transmission target, image data transmission target, etc.

CPU 103 searches server job management table JT(a) for the job ID of a target job, reads in sequence pieces of image data corresponding to the job ID, executes necessary processes according to the job types and the operation instruction information, for example, decompressing of the compressed data for printing, and stores a page of image data in image memory 304. For facsimile transmission jobs, CPU 103 connects to a telephone line, converts the compressed image data so that it conforms to a facsimile transmission format, and sends the converted image data by facsimile via the G3 unit. For image processing such as editing which does not include any printing process, CPU 103 performs appropriate processes and returns the image data via network controlling unit 53 to the client. For jobs requested from network apparatuses, CPU 103 returns a job completion notification to the client along with the job ID. As described above, CPU 103 operates as a job management unit and a process controlling unit.

The print job and the facsimile transmission job registered in server job management table JT(a) can be processed in parallel. Accordingly, CPU 103 registers print jobs in print job table PT and registers facsimile transmission jobs in facsimile transmission job table FT when registering jobs in server job management table JT(a) so that these jobs can be scheduled in parallel according to the priorities.

FIG. 10 shows the construction of print job table PT. Print job table PT includes the job IDs, priorities, registration time, job statuses, and additional information.

The job IDs are job identification numbers for printing. The priorities indicate the priorities of the jobs for printing. The registration time indicates the time when the job was registered. The job statuses indicate the current statues of the jobs such as SUSPENDED, WAITING, and IN PRINTING.

The additional information includes finishing function use information and job suspension information. The finishing function use information is used to judge whether a job interrupt is possible, and the job suspension information is generated when the job is suspended. When the finishing function is used for example, for sorting the sheets having been printed, the sorting process may be damaged if another job interrupts during the sorting process. The finishing function use information is therefore used to prevent a job using the finishing function from being interrupted by another job. For resuming the suspended job, the operation instruction information included in the job suspension information is used.

CPU 103 searches print job table PT for a job having the highest priority each time a page of job is processed. The job having the highest priority is generally processed first. Jobs are deleted from print job table PT when the jobs are completed.

FIG. 11 shows the construction of facsimile transmission job table FT. Facsimile transmission job table FT includes the job IDs, priorities, registration time, job statuses, and additional information.

The job IDs are job identification numbers for facsimile transmissions. The priorities indicate the priorities of the jobs for facsimile transmissions. The registration time indicates the time when the job was registered. The job statuses indicate the current statues of the jobs such as SUSPENDED, WAITING, and IN TRANSMISSION.

Figure 12:
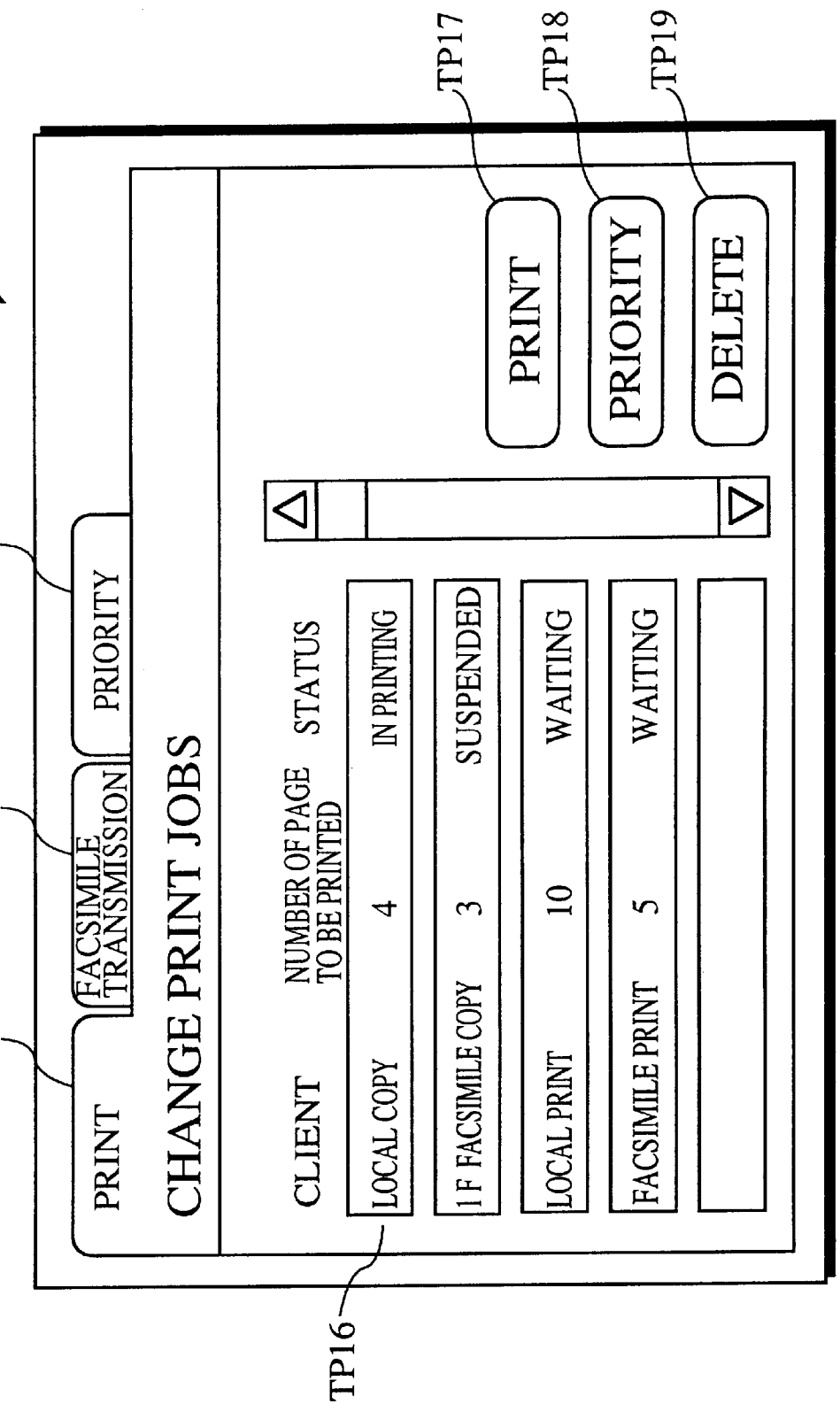
FIG. 12 shows a monitor screen for display on the operation panel of FIG. 3; for print jobs.

Referring to FIG. 12, note that it is possible for the operator of a server terminal to monitor the progress statuses of requested print jobs and facsimile transmission jobs, that is, the operator can monitor whether such jobs are processed, suspended, or waiting. The operator can delete jobs by pressing DELETE key (TP19), immediately execute jobs by pressing PRIORITY key (TP18), or execute print jobs by interrupts by pressing PRINT key (TP17) FIG. 12 shows a monitor screen for print jobs. This monitor screen is read by CPU 101 and displayed on crystal touch panel 91 when the operator presses job management key 100 on operation panel OP then presses TP13 on crystal touch panel 91. The monitor screen, as shown in the drawing, indicates the progress statuses of the requested print jobs. The operator can monitor the progress statuses through this monitor screen.

On the monitor screen for print jobs as shown in FIG. 12, the operator can execute a certain print job by an interrupt by selecting the job and pressing PRINT key TP17 when CPU 103 and updates print job table PT via CPU 101 by giving the highest priority to the job.

The operator can execute a certain print job immediately after the current job by selecting the job and pressing PRIORITY key TP18 when CPU 103 updates print job table PT via CPU 101 by giving the same priority to the job as the current job and by adding a certain time period (e.g., one second) to the registered time of the current job. With this arrangement, the selected print job is executed immediately after the current print job.

The operator can delete a certain print job by selecting the job and pressing DELETE key TP19 when CPU 103 terminates and discards the job via CPU 101.

Figure 13:
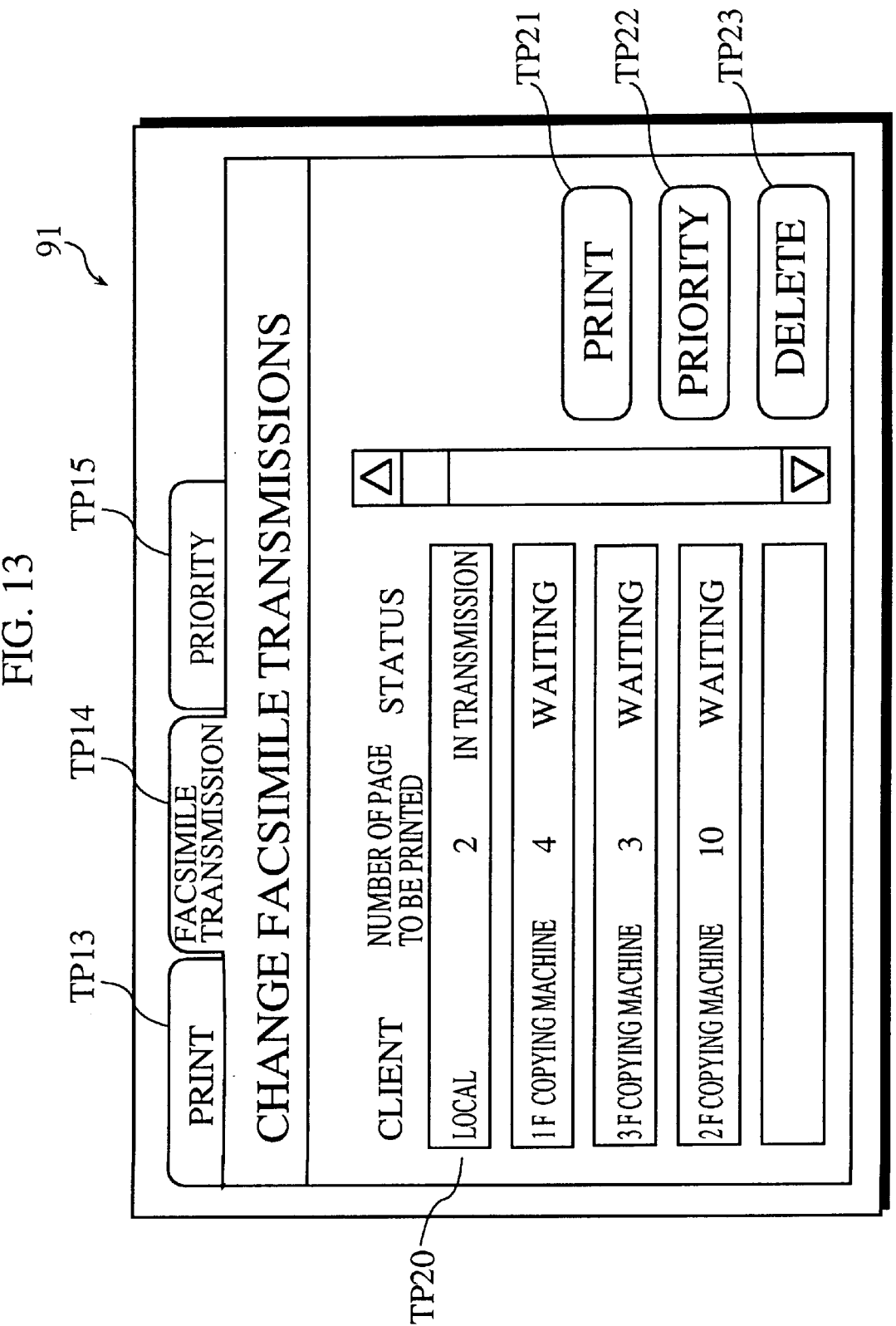
FIG. 13 shows a monitor screen for display on the operation panel of FIG. 3; for facsimile transmission jobs.

Similarly, the operator can monitor the progress statuses of facsimile transmission jobs through the facsimile transmission job monitor screen as shown in FIG. 13. The operator can also delete jobs, immediately execute jobs, or execute print jobs by interrupts with similar operations as those for print jobs. The facsimile transmission job monitor screen is read by CPU 101 and displayed on crystal touch panel 91 when the operator presses job management key 100 on operation panel OP then presses TP14 on crystal touch panel 91.

The following is a description of CPUs 101 and 103 when copying machine 1 operates as a client terminal. To use copying machine 1 as a client terminal, it is first necessary for the operator to realize the functions published by the other apparatuses in the network. In the present invention, a client terminal can selectively issue a first request and a second request. With the first request, the operator can request the other terminals to publish all functions the terminals can disclose; with the second request, the operator can recognize the terminals which provide functions the operator specifies. With such requests, the operator can get necessary information for requesting jobs.

Figure 14:
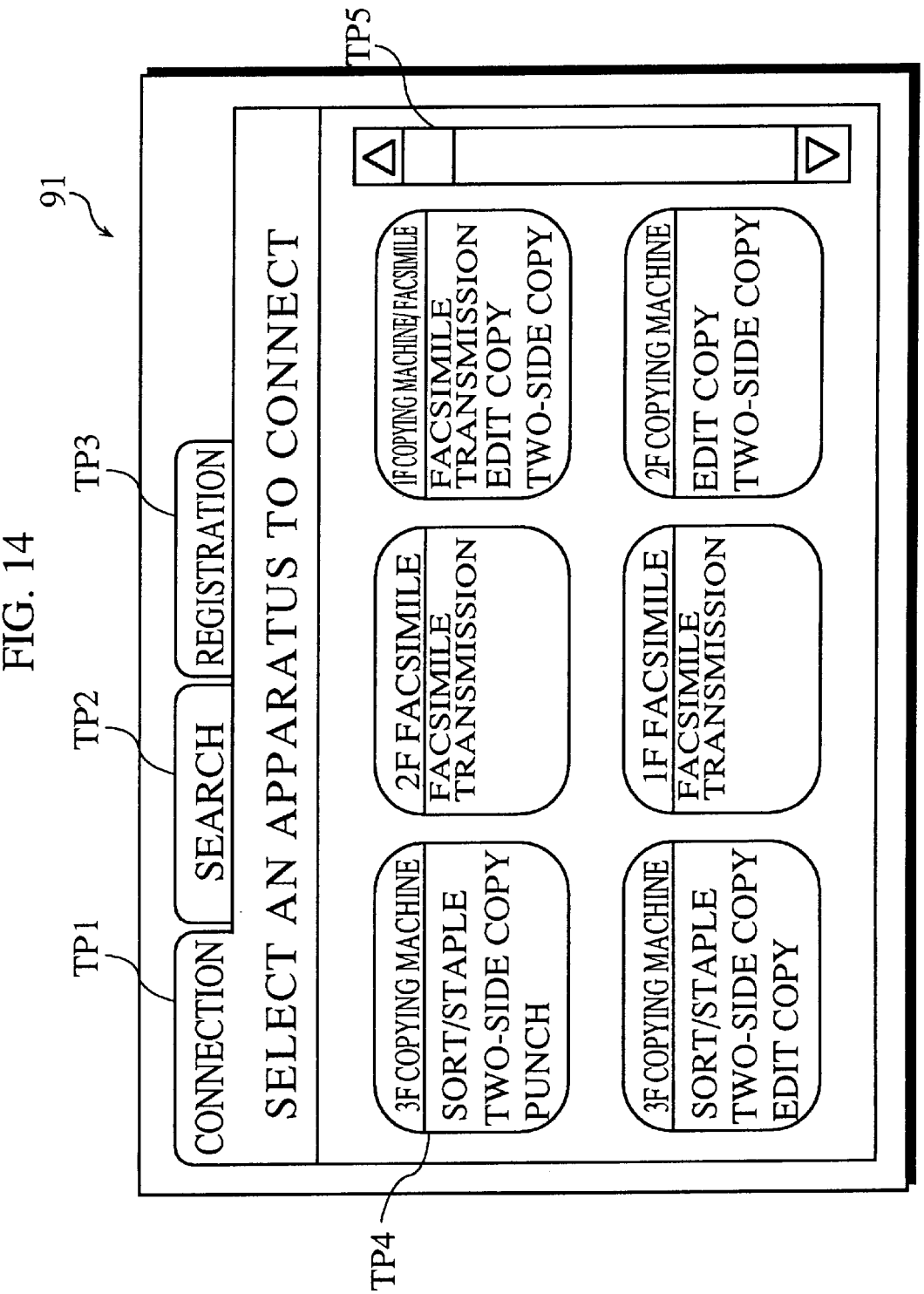
FIG. 14 shows a network connection screen for display on the operation panel of FIG. 3.

The network connection screen, as shown in FIG. 14, which is used for issuing the first request, is displayed on crystal touch panel 91 when the operator presses network key 99 on operation panel OP then touches connection key TP1 on the next screen. The network connection screen is based on guidance menu created by CPU 101. That is, when connection key TP3 is pressed, CPU 101, via network controlling unit 53, requests the other server terminals to publish the functions they provide. CPU 101 generates the guidance menu as shown in FIG. 14 based on the functions and apparatus identification information returned from each terminal, and displays the guidance menu.

Figure 15:
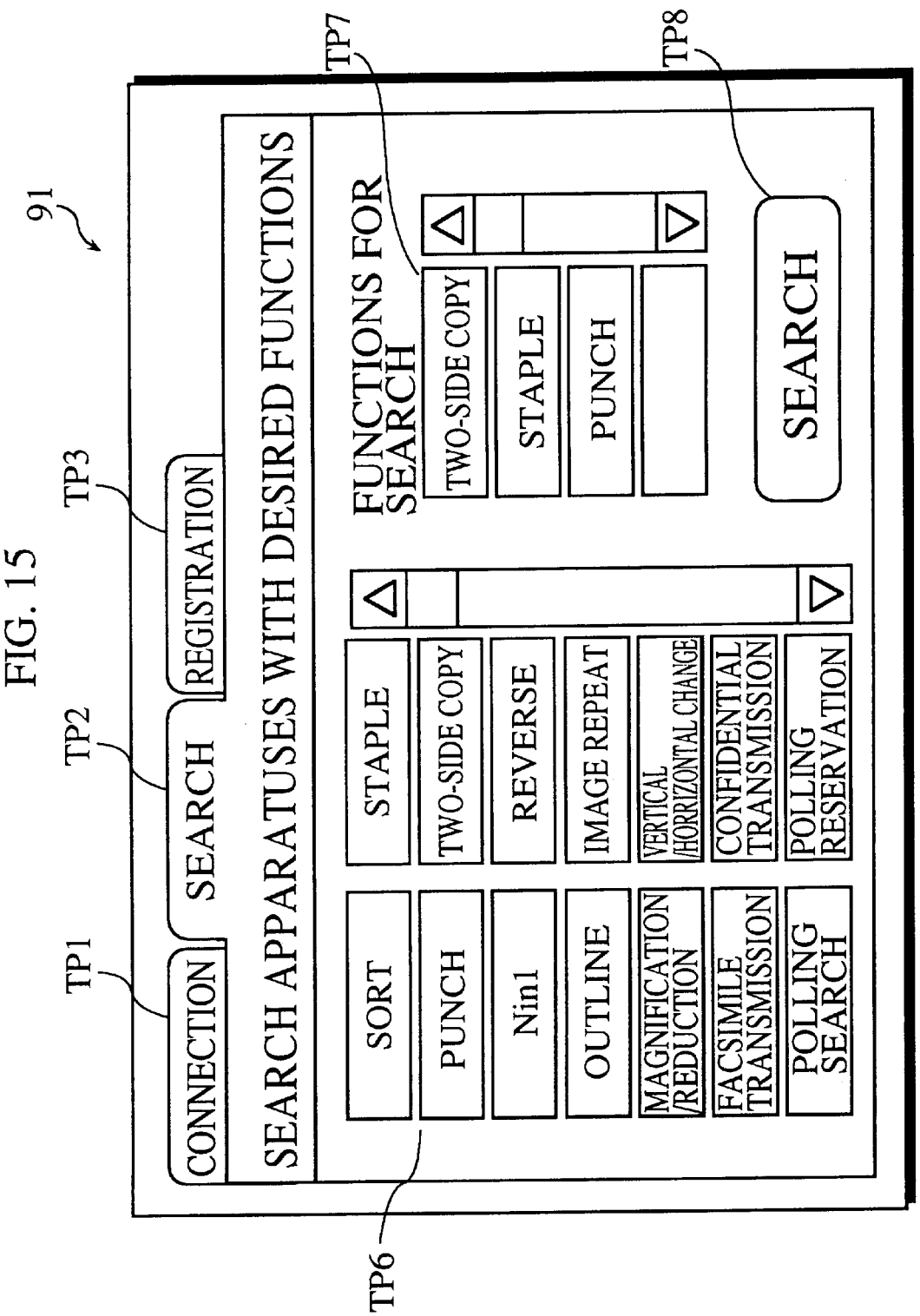
FIG. 15 shows a network search screen for display on the operation panel of FIG. 3.
Figure 16:
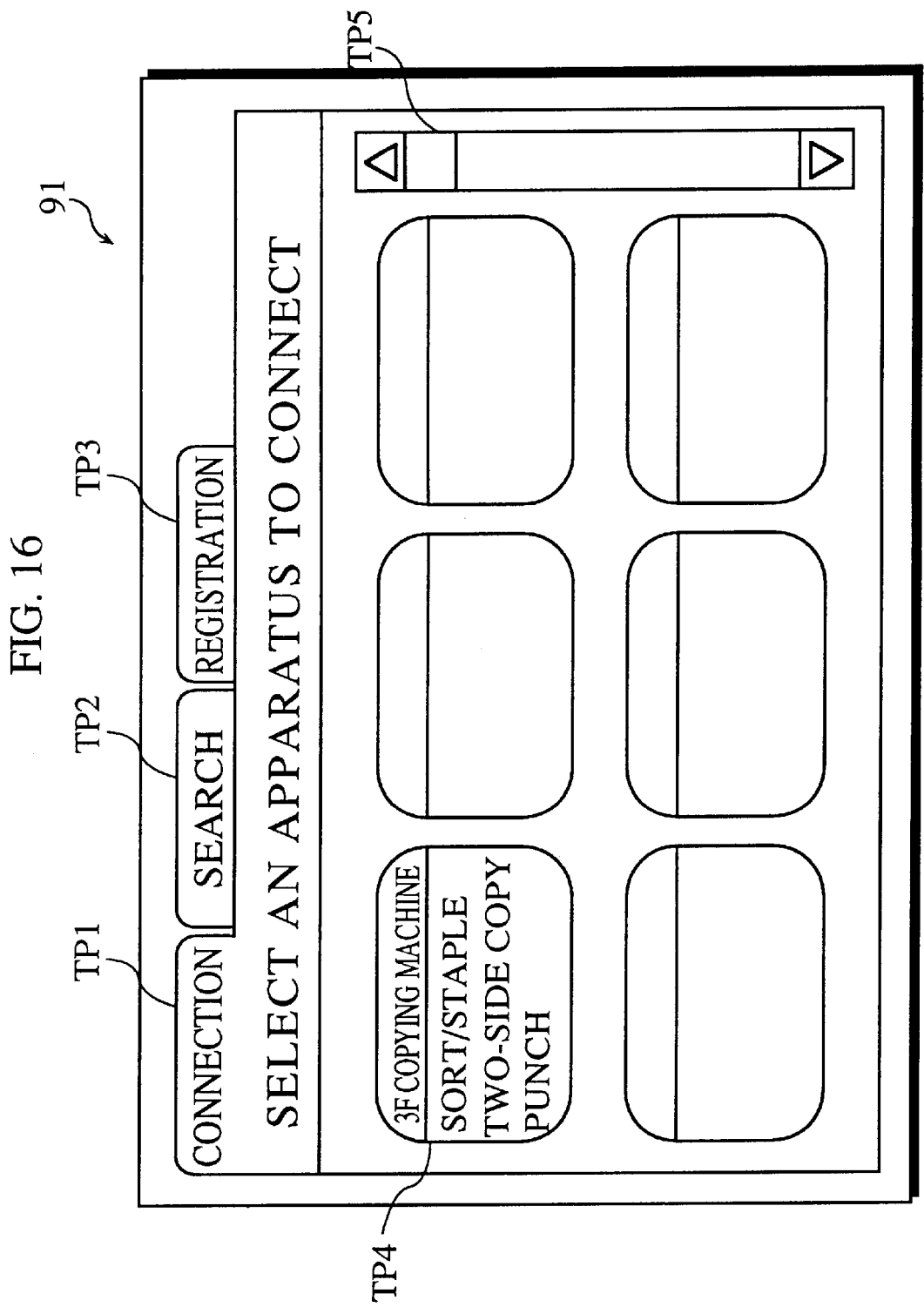
FIG. 16 shows a network connection screen for display on the operation panel of FIG. 3.

The network search screen as shown in FIG. 15, which is used for issuing the second request, is displayed on crystal touch panel 91 when the operator presses network key 99 on operation panel OP then search key TP2 on the next screen. The operator can also request the other terminals to publish functions by specifying functions to be published, such as two-side copying, stapling, and punching then pressing TP7 and search key TP8 when CPU 101 requests the other terminals to publish functions in terms of the specified functions. The network search screen is based on guidance menu created by CPU 101. That is, when connection key TP2 is pressed, CPU 101, via network controlling unit 53, requests the other server terminals to publish the functions they provide. CPU 101 generates the guidance menu as shown in FIG. 16 based on the functions and apparatus identification information returned from each terminal, and displays the guidance menu. In this embodiment, as shown in FIG. 16, only a copying machine on the third floor is displayed as an apparatus that provide the specified functions, namely, two-side copying, stapling, and punching. In this way, CPU 101 functions as a guidance menu generating unit for generating the guidance menu.

When the operator presses one of keys TP4, each of which represents a server terminal, CPU 101 issues a connection request to the server terminal related to the pressed key. The server terminal sends detailed functions and the format information to copying machine 1, in response to the request. The operator, at this stage, can request the server terminal to send telephone number information, if necessary. CPU 101 generates format information based on all the above information sent from the server terminal and generates the panel screen for using the server terminal.

In more detail, CPU 101 generates function management table FUNK, as shown in FIG. 17, in RAM 121. More specifically, CPU 101 fetches information on the functions from the detailed information sent from each server apparatus, unites similar functions in function groups, unites similar function groups in applications, and generates function management table FUNK with this information plus additional information which includes function parameters and operation instruction information.

In the present embodiment, for example, application 1 represents the copy application, application 2 the printing application, and application 3 the facsimile application. Function group 1 of the copy application represents the standard function group, function group 2 copy format function group, function group 3 editing function group, function group 4 finishing function group, where function 1 of the finishing function group represents the non-sort function, function 2 the sort function, function 3 the sort-staple function, and function 4 the punch function.

Figure 18A:
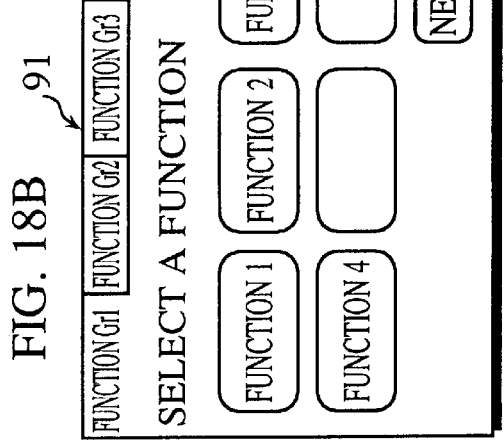
FIGS. 18A–18C show panel screen for display on the operation panel of FIG. 3; used for selecting applications, function groups, and functions.
Figure 18B:
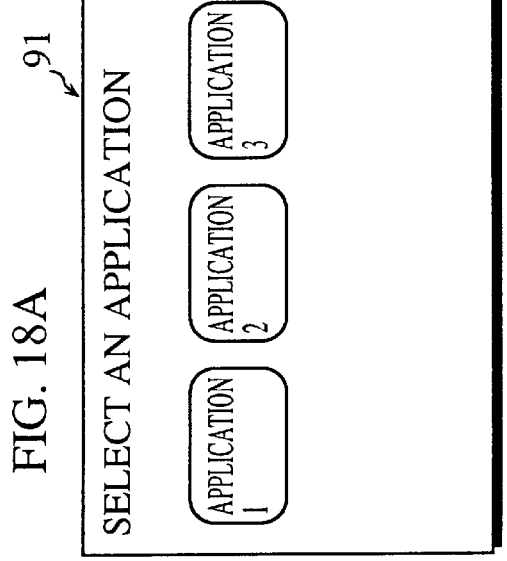
Figure 18C:
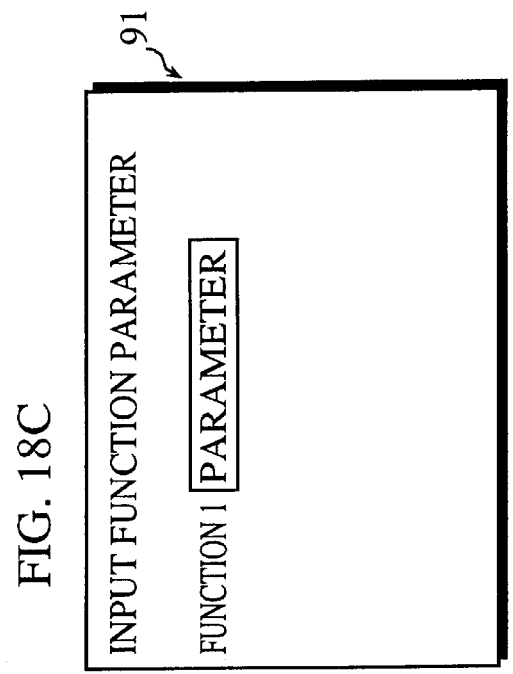

CPU 101 generates the panel screens as shown in FIGS. 18A–18C and displays the screens on crystal touch panel 91 at the request of the operator. As shown in FIGS. 18A–18C, the operator first selects an application, then selects a function group, thirdly selects a function, and finally inputs function parameters. By using function management table FUNK, which includes various functions, it is possible to generate a plurality of panel screens in a hierarchical construction. When the operator inputs an instruction for requesting a job to a server, CPU 101 sends the request to the server under the format disclosed by the server. In this way, CPU 101 functions as a job request transmitting unit.

Figure 19B:
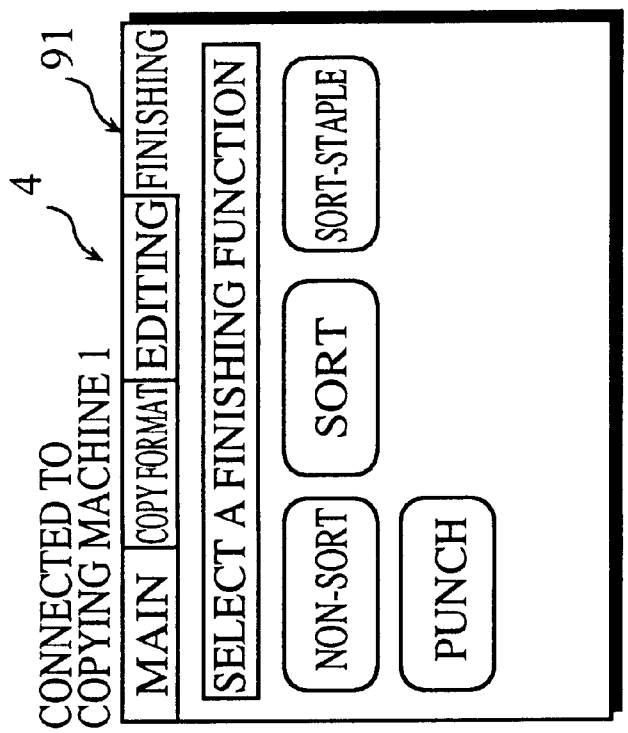
FIG. 19B shows a panel screen for display on the operation panel of FIG. 3; after a network connection.
Figure 19A:
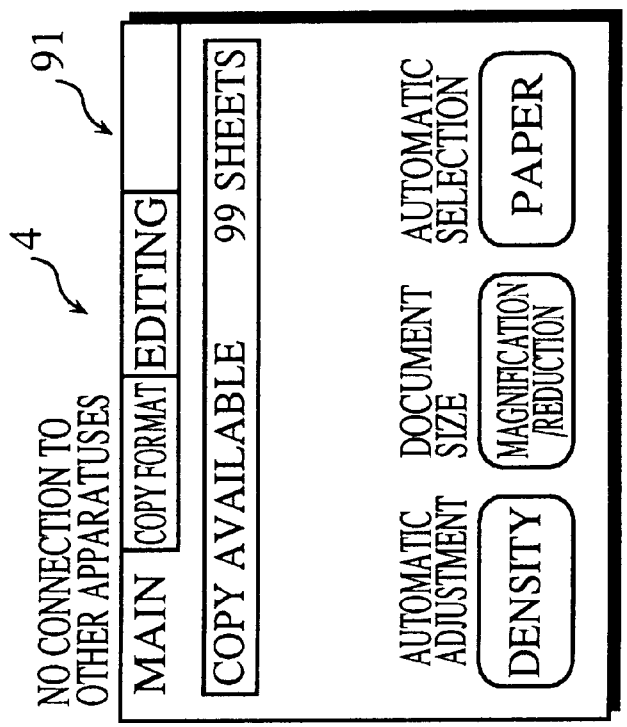
FIG. 19A shows a panel screen for display on the operation panel of FIG. 3; before a network connection.

The main screen on crystal touch panel 91 may be changed, as shown in FIG. 19B, so that newly acquired functions are displayed as new apparatuses are connected to the network. For a copying machine not having the finishing function such as copying machine 4, for example, the main screen on crystal touch panel 91 does not include a panel for the finishing function, as shown in FIG. 19A. Accordingly, it is impossible for the operator to use such a function under this condition. In contrast, the main screen may be updated when the client apparatus is connected to a server apparatus which has the finishing function. In this case, the main screen displays the functions of the finishing function, namely, NON-SORT, SORT, SORT-STAPLE, and PUNCH, as shown in FIG. 19B. The operator can request the server terminal to execute the finishing function from this panel screen.

CPU 101 manages the jobs requested of the other server terminals by using client job management table JT(b). Client job management table JT(b) is generated by CPU 101 based on inputs from operation panel OP and the job IDs sent from the servers, and is stored in RAM 121. Client job management table JT(b) is used to print the job completion report which notifies the completion of a job by a server and to print edited images.

FIG. 20 shows client job management table JT(b). Client job management table JT(b), as shown in the drawing, includes job IDs, server names, server job IDs, job types, applications, post-processing names, and operation instruction information.

The job IDs are identification numbers of the jobs requested from the apparatus itself (local apparatus). The server job IDs are job IDs assigned for each server terminal. The job types are, for example, copying, facsimile transmission, image editing, etc. The post-processing names indicate the processes which are executed after jobs complete, such as COMPLETION REPORT, NONE, and IMAGE PRINT. The operation instruction information indicates operations corresponding to the job types, such as the number of sheets in a document, number of sheets to be printed, print/transmit size, image data format (compressed/non-compressed), facsimile transmission destination, and image data transmission destination.

The following is a description of an operation sequence in the network including the copying machines 1, 4, and 6 described above. It is assumed that the terminals in the network have already published their functions. There are two sequences available for the network: (1) the network connection/function-use sequence for issuing the first request, that is, requesting the other terminals to publish all functions the terminals can disclose, and (2) the network function search sequence for issuing the second request, that is, requesting the other terminals to publish certain functions.

Figure 21:
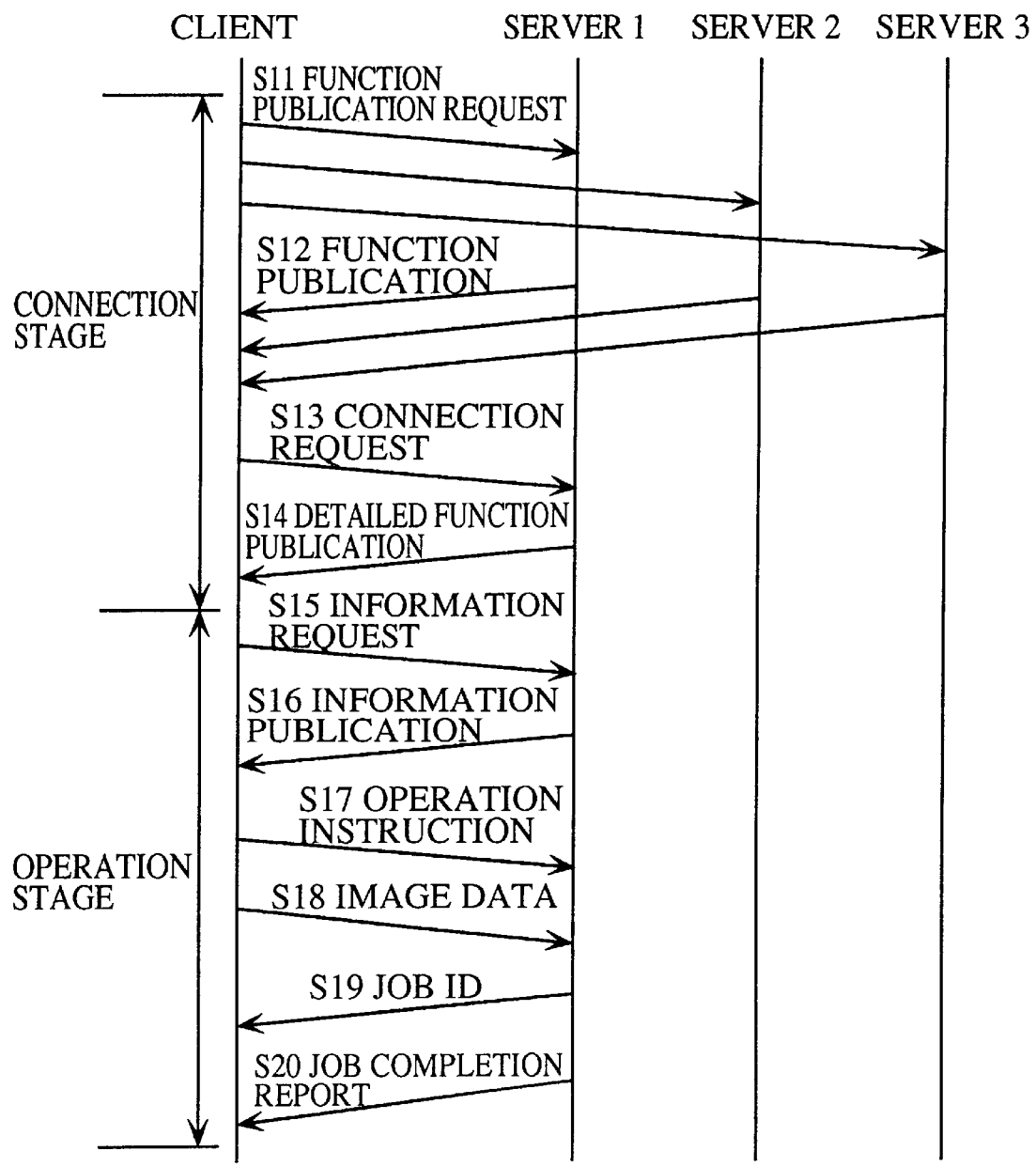
FIG. 21 shows a network connection/function use sequence.

The following is a description of the network connection/function-use sequence for issuing the first request. FIG. 21 shows the network connection/function use sequence. As shown in the drawing, the network connection/function-use sequence includes the network connection stage and the network operation stage.

The operator of the current client apparatus displays the network connection screen as shown in FIG. 14 to enter the connection stage. CPU 101 of the current client apparatus requests all the apparatuses connected to the network (servers 1, 2, and 3) to publish functions (S11). Since the guidance menu has not been made at this stage, TP4 of the network connection screen displays nothing. Servers 1, 2, and 3, on receiving the requests, returns the outline of the functions. CPU 101 of the client apparatus generates the guidance menu based on the outline and displays the guidance menu on crystal touch panel 91.

The operator selects a server to which the operator intends to request a job by pressing TP4 on the guidance menu displayed on crystal touch panel 91. Suppose the operator selects server 1. The client apparatus sends a connection request to server 1 (S13). Server 1, on receiving the request, sends information of detailed functions and the format information (S14). With this performance, the client apparatus is connected to server 1, enabling the client apparatus to request jobs under the format revealed in the format information.

At the operation stage, the operator can request server 1 to send telephone number information, if necessary, (S15). Server 1 publishes the requested information (S16). CPU 101 of the client apparatus generates function management table FUNK based on the received information and generates the panel screen based on function management table FUNK. If the telephone number information is not necessary, steps 15 and 16 are skipped.

The operator inputs the operation instruction information from crystal touch panel 91 to let image reading unit IR read images. CPU 101 transfers the read image data to the server 1 (S17, S18). CPU 103 of server 1 registers the operation instruction information in server job management table JT(a), stores the image data into memory unit 30, and sends the job ID for the requested job to the client apparatus (S19). Server 1 sends the job completion report to the client apparatus along with the job ID, the job completion report informing a normal termination or a failure (S20).

As described above, network jobs and local jobs are effectively performed by effectively using each of the functions published to the network.

Figure 22:
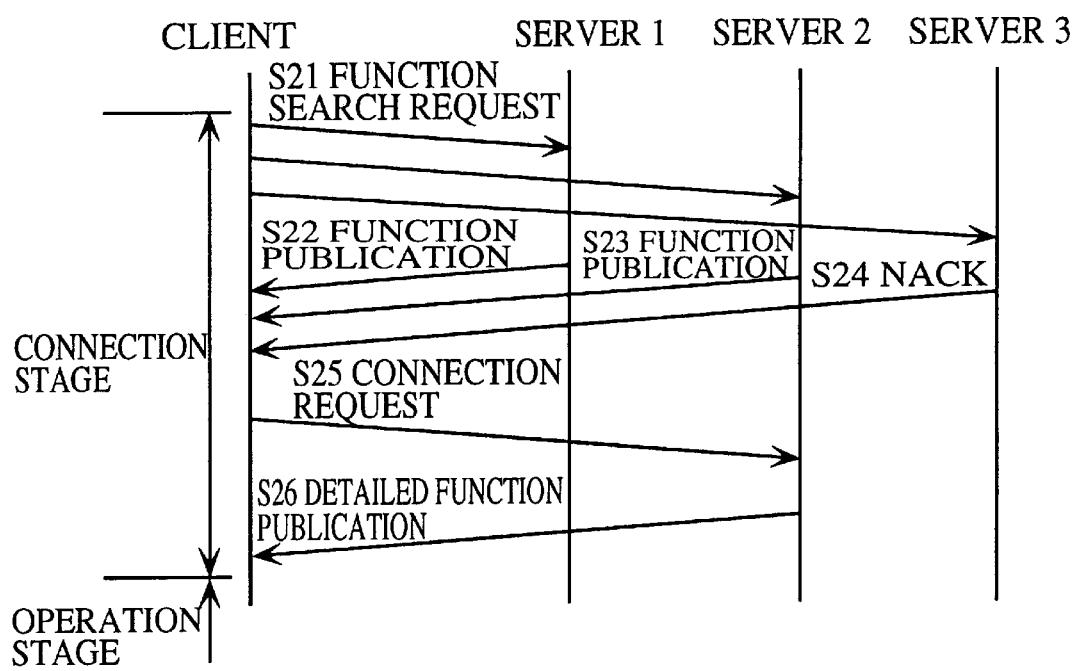
FIG. 22 shows a network function search sequence.

The following is a description of the network function search sequence for requesting the second request. FIG. 22 shows the network function search sequence. As shown in the drawing, the network function search sequence also includes the network connection stage and the network operation stage. The network operation stage of this sequence is the same as that of the network connection/function-use sequence, and the description of the stage is omitted here. In the network function search sequence, the client terminal requests the other terminals to publish specified functions and connects to a terminal providing a desired function.

The operator of the current client apparatus requests all the server apparatuses connected to the network (servers 1, 2, and 3) to publish specified functions from the network search screen as shown in FIG. 15 (S21).

Each of servers 1, 2, and 3 publishes specified functions if it has and can disclose the functions; each of servers 1, 2, and 3 sends "NACK" to the client apparatus if a server does not have the functions or if it cannot disclose the functions (S22–S24). The client apparatus generates the guidance menu as shown in FIG. 16 based on the outline information sent by the server apparatuses.

The operator selects a server to which the operator intends to request a job by pressing TP4 on the guidance menu displayed on crystal touch panel 91. Suppose the operator selects server 2. The client apparatus sends a connection request to server 2 (S25). Server 2, on receiving the request, sends information of detailed functions (S26). With this performance, the client apparatus is connected to server 2, enabling the client apparatus to request jobs with the specified functions (TWO-SIDE COPY, STAPLE, and PUNCH in this example).

Figure 23:
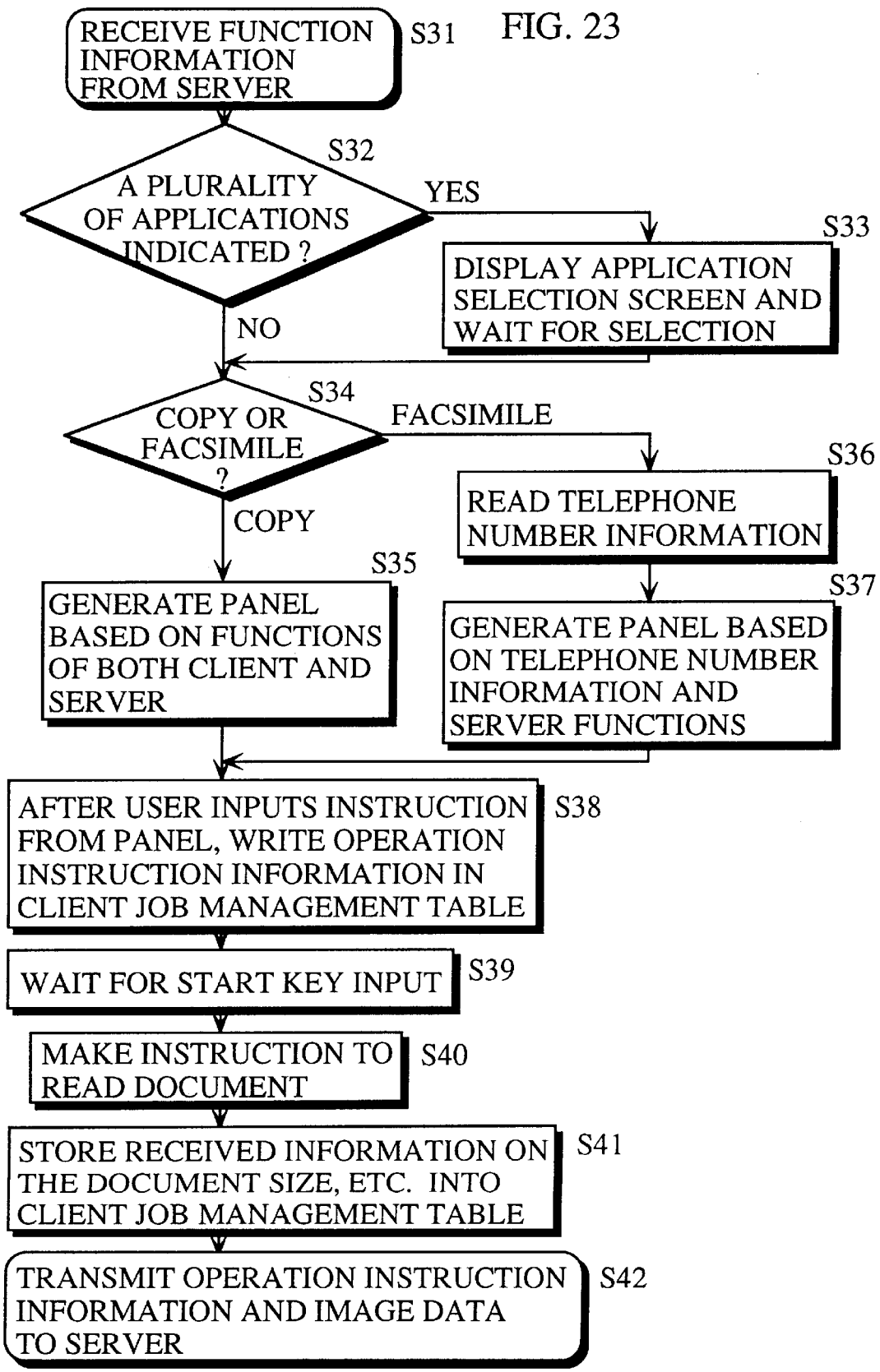
FIG. 23 is a flowchart showing the generation of operation instruction information by the client apparatus at the connection and operation stages.

The following is a detailed description of the operation of CPU 101 of the client apparatus at the connection and operation stages. FIG. 23 is a flowchart showing the operation of CPU 101 of the client apparatus at the connection and operation stages. More specifically, the flowchart shows the operation of CPU 101 after CPU 101 receives the function information from a server apparatus and until CPU 101 sends the operation instruction information and image data to the server apparatus.

CPU 101 of the client apparatus receives the function information sent from a server apparatus via network controlling unit 53 and memory unit 30 (S31). The CPU 101 judges whether the received function information indicates a plurality of applications (in this case, the copy application and the facsimile application) (S32). If the received function information indicates a plurality of applications, CPU 101 displays the application selection screen on crystal touch panel 91, and waits for the operator to select an application (S33).

After an application is selected, the CPU 101 judges whether the application is a copy application or a facsimile application (S34). If it is a copy application, the CPU 101 generates the format information based on the copy function information stored in ROM 111 of the local client apparatus and based on the copy function information of the server apparatus. The CPU 101 then generates a panel based on the format information and displays the panel on crystal touch panel 91, enabling the operator to give an instruction to the apparatus for copying (S35). If the application is a facsimile application, the CPU 101 reads the telephone number information stored in the server apparatus (S36). The CPU 101 generates a panel based on the telephone number information and the facsimile function information of the server apparatus, and displays the panel on crystal touch panel 91 (S37).

If the operator inputs instructions on the displayed panel, the CPU 101 generates the operation instruction information based on the input instructions, then writes the operation instruction information in client job management table JT(b) in RAM 121 (S38). The CPU 101 waits for start key 96 to be pressed after the operator sets the operation mode (S39).

If start key 96 is pressed, the CPU 101 instructs CPU 102 to read the document set in the client apparatus (S40). CPU 102 reads the document according to instructions specified by the operator, for example, under a reading mode such as a mode for changing the magnification/reduction rate in reading, a mode for digitizing, and a mode for multi-valuing, and stores the image data read under such a mode into code memory 306. CPU 102 also sends information on the document size, number of sheets in the document and the like to CPU 101.

CPU 101 stores the received information on the document size, number of sheets in the document and the like into client job management table JT(b) (S41). CPU 101 transfers the operation instruction information from client job management table JT(b) to the server apparatus via memory unit 30 and network controlling unit 53, and instructs CPU 103 to transmit the image data (S42). CPU 103 transmits the image data to the server apparatus via memory unit 30 and network controlling unit 53.

As shown in the above description, the operator of each terminal (e.g., copying machine 1, 4, or 6) in the network, as a client, requests the other server terminals to publish functions, receives information from a connected server apparatus, generates the guidance menu based on the received information, and displays the guidance menu on crystal touch panel 91. With such a construction, the operator of each terminal as a client can easily realize the location of the server apparatuses and the functions they provide, improving the efficiency of using the terminals in the network.

In this embodiment of the present invention, the operator of each of copying machines 1, 4, and 6 in the network selectively sends the first request for requesting the other terminals to publish all functions and the second request for requesting the other terminals to publish functions in terms of the specified functions. With such a construction, the operator can selectively get information on all the functions available in the network and get information on the terminals that provide desired functions.

As also shown in the above description, the operator of each terminal (e.g., copying machine 1, 4, or 6) in the network as a client selects a server apparatus, to which the operator intends to request a job, by inputting instructions from the guidance menu displayed on crystal touch panel 91, requests the server apparatus to send the format information revealing the format required for requesting the jobs, receives the format information from the server apparatus, and requests jobs under the format from a screen on crystal touch panel 91. With such a construction, it is not necessary to install new programs respectively suitable for new functions of new types of apparatuses, enabling the full use of the functions of all the terminals in the network and enabling the operator to easily change the combination of apparatuses. It is also possible in executing a job to use functions of both the local apparatus and remote apparatuses.

Figure 24:
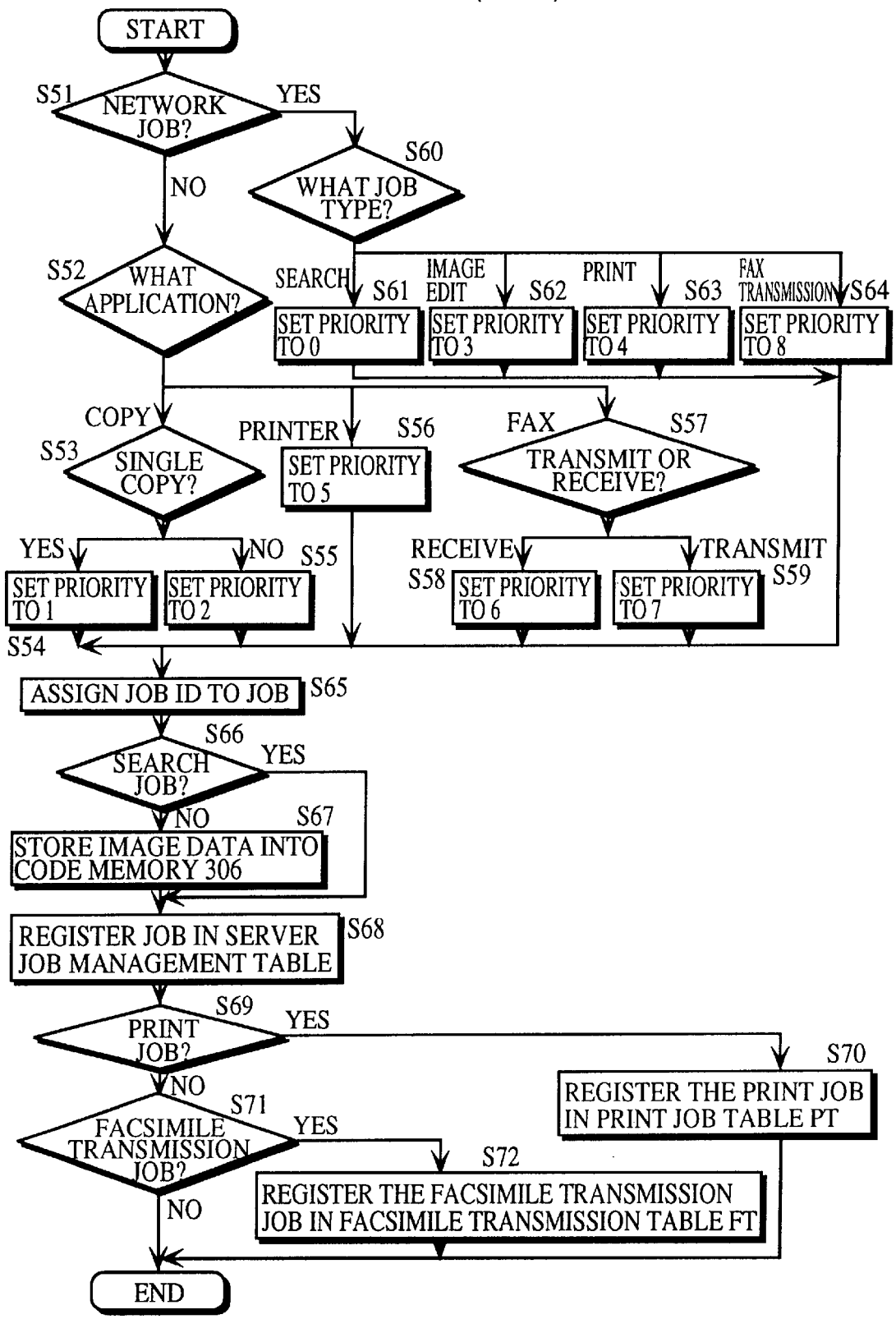
FIG. 24 is a flowchart showing the job registration performed by a server apparatus at the operation stage.

Now, the operation of CPU 103 at the operation stage is described in detail. FIG. 24 is a flowchart showing the procedure of job registration performed by CPU 103 in a server apparatus. More specifically, the flowchart shows the operation of CPU 103 while the server apparatus receives a job request from a client apparatus, gives a priority to the job, and registers the job in the server apparatus. This operation includes a job of reading a document which is performed by the server apparatus itself.

CPU 103, on receiving a job request, judges whether the job request is a network job request sent from another apparatus or a local job request from the local apparatus (S51). If the job request is for a local job, CPU 103 determines the application to deal with the network job (S52), and sets the priority of the job according to the application and the operation mode in the application (S53–S59). If the job request is for a network job, CPU 103 determines job type (S60), and sets the priority of the job (S61–S64).

CPU 103 assigns the job ID to the job (S65). If the job is not a search job, CPU 103 stores into code memory 306 the image data input from image reading unit IR and the image data input from network controlling unit 53 (S66, S67). CPU 103 registers the job in server job management table JT(a) to form this table (S68).

CPU 103 registers the print jobs in print job table PT if the print job uses printer unit PRT of the local apparatus (S69, S70). CPU 103 registers the facsimile transmission jobs in facsimile transmission job table FT if the jobs use facsimile converting unit 51 and G3 unit 52 of the local apparatus in transmitting data by facsimile (S71, S72).

CPU 103 executes the jobs registered in the server apparatus based on the priorities, and in parallel if possible, and deletes the jobs from server job management table JT(a) as the jobs complete. The print jobs and the facsimile transmission jobs, however, are executed page by page as described earlier based on the priorities and the registered times since only one printer unit and one telephone line are available.

Now, the operation of CPU 103 of the server apparatus is described in terms of scheduling of the print jobs and the facsimile transmission jobs.

Figure 25:
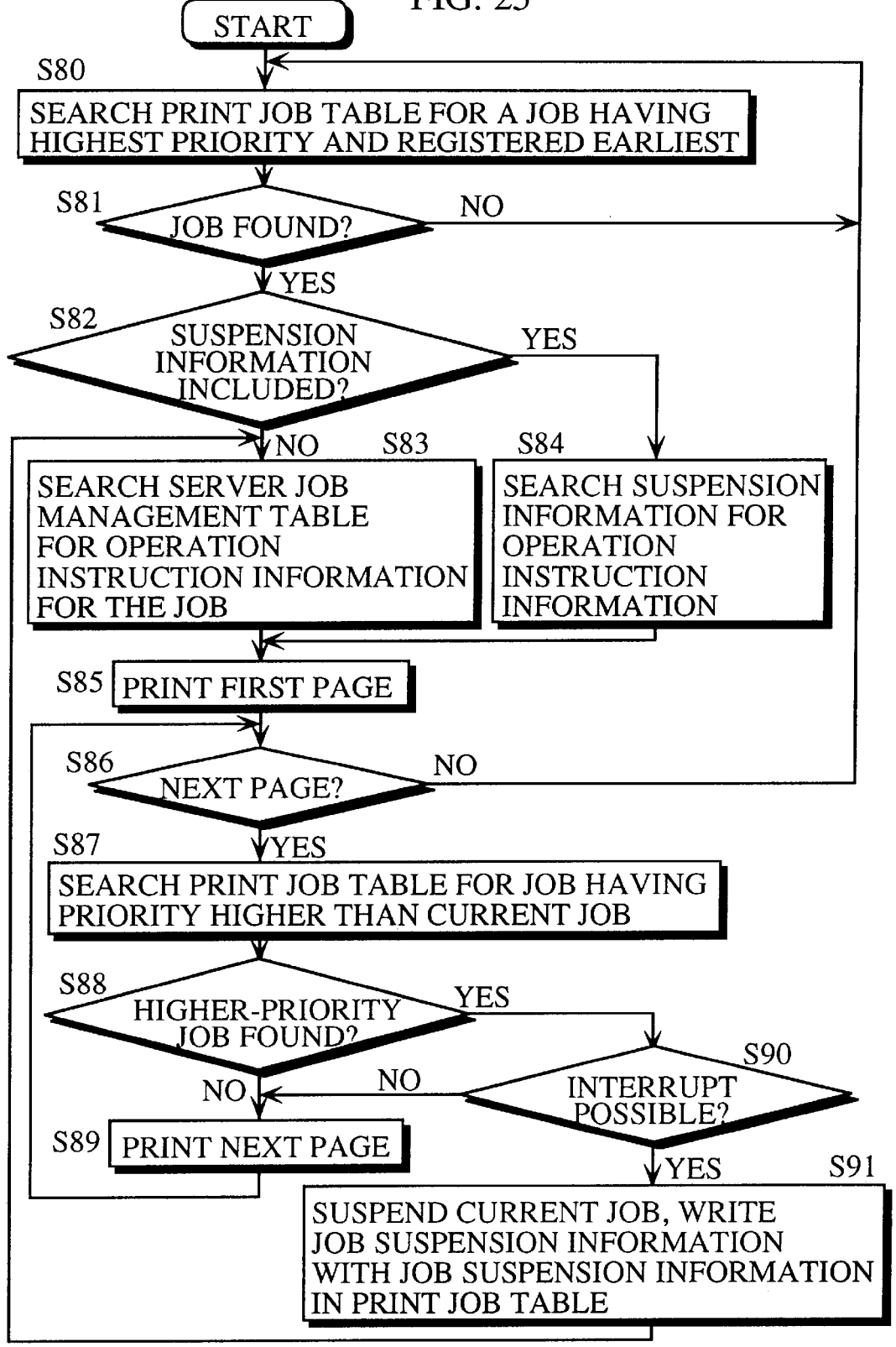
FIG. 25 is a flowchart showing the procedure of scheduling of print jobs.

FIG. 25 is a flowchart showing the procedure of scheduling of the print jobs by CPU 103 of the server apparatus. As shown in the flowchart, CPU 103 searches print job table PT for a job having the highest priority (S80). If CPU 103 finds a plurality of jobs having the highest priority, CPU 103 then searches for a job having been registered earliest among the plurality of jobs. CPU 103 refers to the additional information in the print job to judge whether the information includes a suspension information (S82).

If the suspension information is not included, CPU 103 searches server job management table JT(a) for the operation instruction information for the job (S83). If the suspension information is included, CPU 103 searches the suspension information for the operation instruction information (S84). CPU 103 prints the first page if the suspension information is not included; CPU 103 resumes printing from the first page of not printed pages of the suspended job if the suspension information is included (S85).

CPU 103 judges whether another page should be processed by referring to the memory management table while the current page is processed. If there is no other pages to be processed, CPU 103 performs the termination process for the current job and judges whether there is another job (S86, S80). Note that the job termination report is sent to the client apparatus as shown in step S20 and the image data is discarded when CPU 103 performs the termination process.

If there is another page to be processed, CPU 103 searches print job table PT for a job having a priority higher than the current job (S87). If CPU 103 judges that there is not a job having a priority higher than that of the current job, CPU 103 prints the next page (S88, S89) and returns to step S86.

If CPU 103 judges that there is a job having a priority higher than that of the current job, CPU 103 judges whether an interrupt of the higher-priority job is possible by referring to the finishing function use information in the additional information of the current job in print job table PT (S90). If CPU 103 judges that an interrupt of the higher-priority job is not possible since the current job uses the finishing function, CPU 103 continues to process the current job (S89).

If CPU 103 judges that an interrupt of the higher-priority job is possible, CPU 103 suspends the current job, writes the job suspension information in print job table PT, the job suspension information including the operation instruction information (S90). CPU 103 then starts processing another job at step S83.

Figure 26:
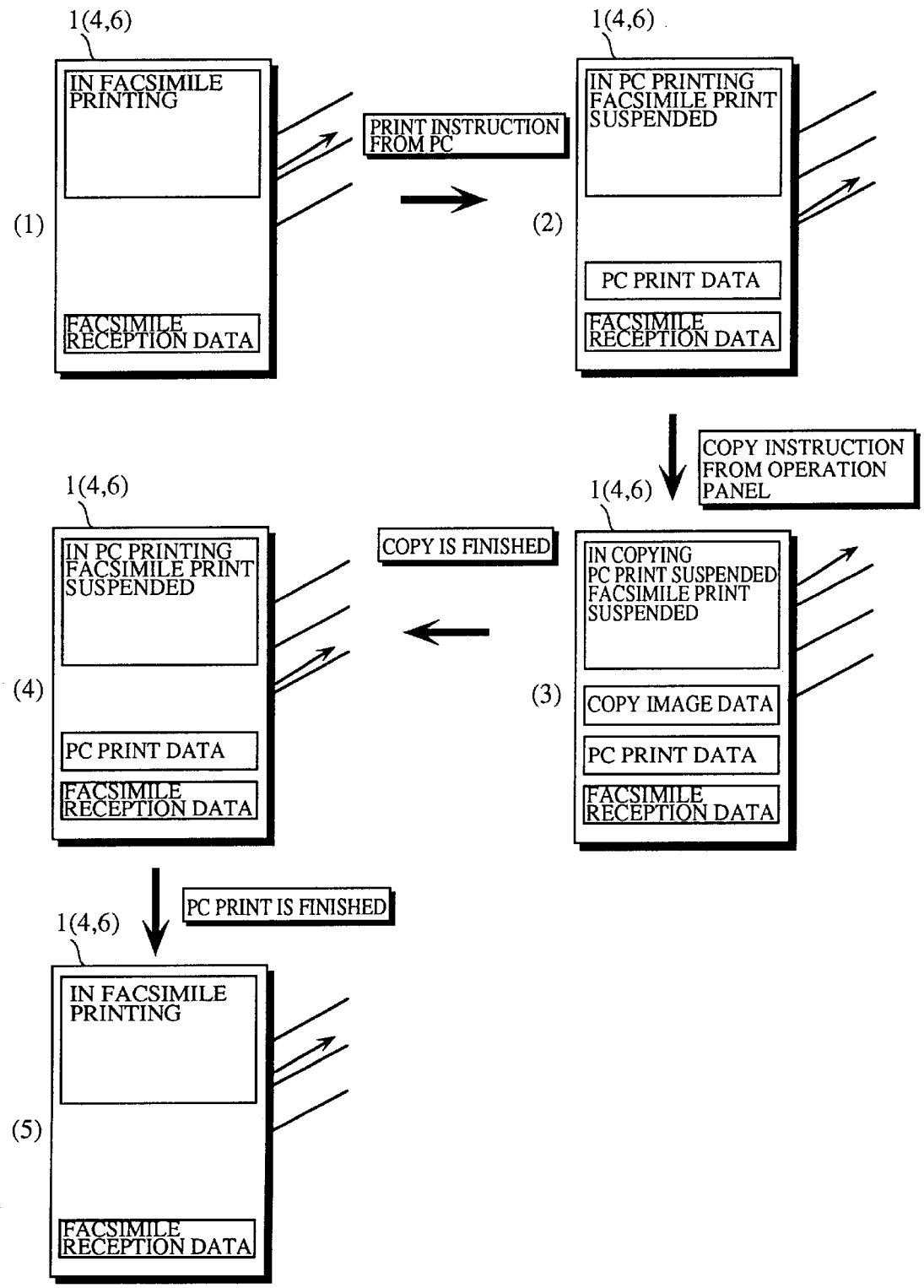
FIG. 26 shows a procedure of handling an interruption of a print job.

FIG. 26 shows a procedure of handling an interruption of a print job. As shown in the drawing, a plurality of different applications such as the copy, facsimile, and PC printer may respectively request copying machine 1 as a server to execute print jobs. If a PC sends a print instruction to copying machine 1 while copying machine 1 is printing the data sent by facsimile, copying machine 1 suspends the facsimile printing and executes the PC printing since the priority of the facsimile printing is "7" and the priority of the PC printing is "4" ((1)–(2) in the drawing). If the operator inputs a copy instruction from crystal touch panel 91 while copying machine 1 is executing the PC printing, copying machine 1 suspends the PC printing and executes the copying since the priority of the PC printing is "4" and the priority of copying is "1" or "2" ((3)). After completing the copying, copying machine 1 resumes the suspended PC printing since no other higher-priority print jobs have been requested ((4)). After completing the PC printing, copying machine 1 resumes the suspended facsimile printing since no other higher-priority print jobs have been requested ((5)).

In the conventional techniques, the operator was required to press interrupt key 97 on operation panel OP to execute the PC printing during the execution of a facsimile printing. In the conventional techniques, the operator had to wait until both the PC printing and facsimile printing completed before executing the copying even if the copying had higher priority. In contrast, it is possible in this embodiment of the present invention to automatically execute a higher-priority interrupt job without pressing the interrupt key. It is also possible in this embodiment of the present invention to automatically resume suspended jobs based on the priorities.

The construction as described above achieves optimum processing thanks to the job scheduling based on the priorities and registered times and also thanks to the automatic execution of higher-priority print jobs.

As described above, in this embodiment, each of copying machines 1, 4, and 6 assigns predetermined priorities to the print jobs requested by each terminal, manages the statuses of execution of the requested print jobs with print job table PT, periodically searches the table for the highest-priority job, and executes the highest-priority job. Such a construction improves operation and achieves optimum order in the print process thanks to no necessity for the operator to manually operate to execute an interrupt job and also thanks to the automatic execution of higher-priority print jobs.

In this embodiment, each of copying machines 1, 4, and 6 manages the statuses of execution of the requested print jobs, namely, waiting, suspended, and in printing, with print job table PT, and executes printing of the requested jobs based on the statuses and the priorities. Such a construction achieves prompt printing based on the priorities and achieves optimum order in the print process.

In this embodiment, priorities are also given to printing types such as copy, TC print, and facsimile print, and such priorities are managed with print job table PT. With such a construction, it is possible to effectively use one print unit based on the printing type priorities.

In this embodiment, priorities are given to all the print jobs requested from both the local apparatus and remote apparatuses, and such priorities are managed with print job table PT. With such a construction, it is possible to effectively use all the apparatuses in the network for printing including the local apparatus itself.

In this embodiment, the print jobs are managed in units of pages with print job table PT. This makes it easier to resume the suspended jobs.

The present embodiment of the present invention also achieves an effective use of printer unit PRT in copying machines 1, 4, and 6 and facsimile 5 thanks to use of copying machines 1, 4, and 6.

Figure 27:
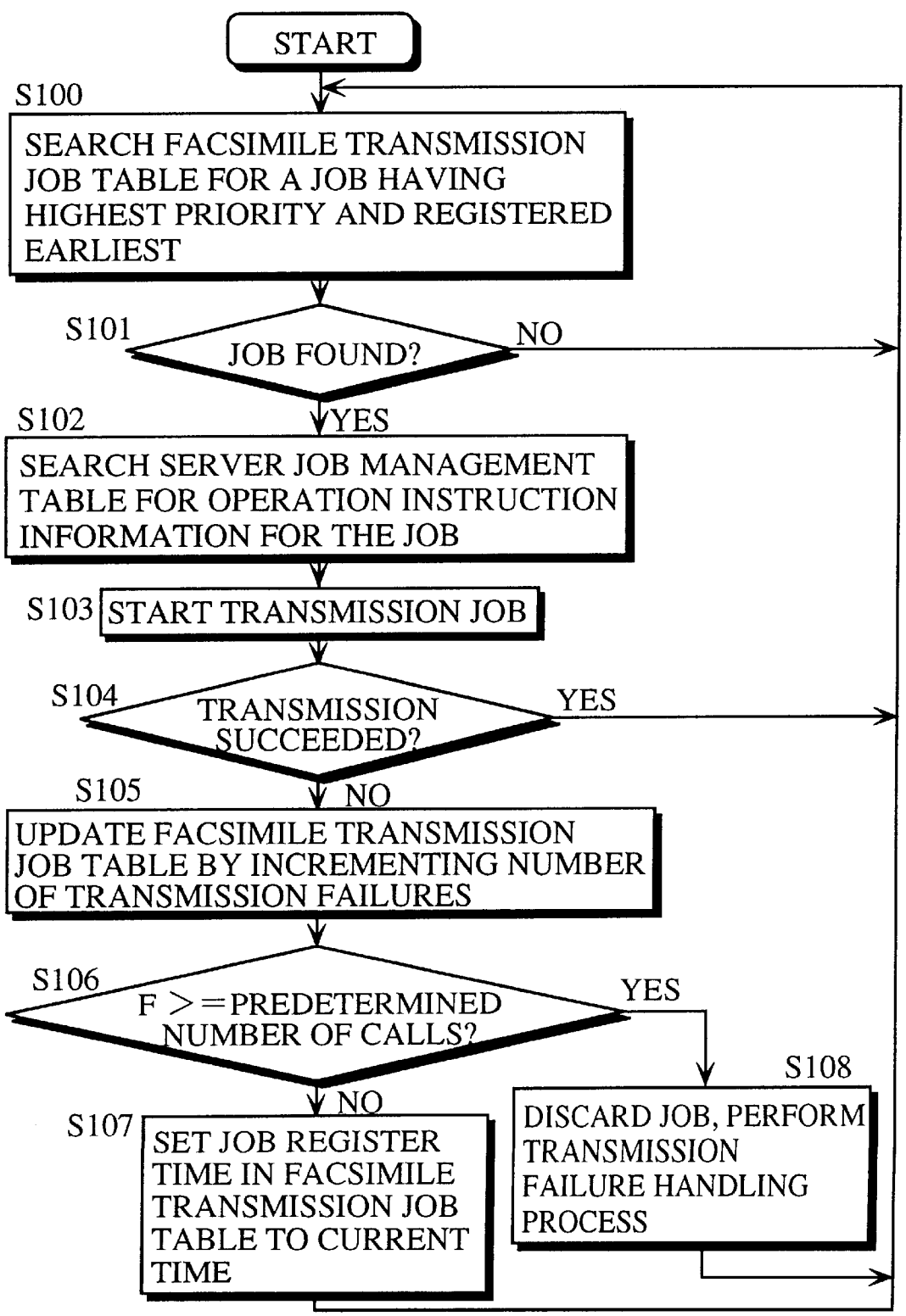
FIG. 27 is a flowchart showing the procedure of scheduling of facsimile transmission jobs.

Now, scheduling of facsimile transmission jobs is described. FIG. 27 is a flowchart showing the procedure of scheduling of facsimile transmission jobs by CPU 103 of a server apparatus. CPU 103 searches facsimile transmission job table FT for a job having the highest priority among the registered jobs (S100). If CPU 103 finds a plurality of jobs having the highest priority, CPU 103 then searches for a job having been registered earliest among the registered jobs.

CPU 103 searches server job management table JT(a) for the operation instruction information for the job (S102). CPU 103 reads image data and executes the facsimile transmission job according to the operation instruction information (S103) If the facsimile transmission job terminates normally (S104), ;CPU 103 performs the termination process and discarding for the current job and returns to step S100. Note that the job termination report is sent to the client apparatus as shown in step S20 and the image data is discarded when CPU 103 performs the termination process. Also note that interrupt requests are not allowed for the facsimile transmission jobs since it would make connection to the telephone line very complicated and it may cause connection failures.

If the execution of the job fails (S104), CPU 103 updates facsimile transmission job table FT by incrementing the number of transmission failures (S105), and judges whether the number of transmission failures has reached a predetermined number of calls (S106). If the number has not reached, CPU 103 updates the job register time in facsimile transmission job table FT by setting the job register time to the current time (S107), and returns to step S100. This is because an immediate call after a failure may end up in a failure since there is a great possibility that the line is still busy.

If the number has reached the predetermined number of calls at step S106, CPU 103 notifies the client apparatus of the transmission failure and ends the job or performs a transmission failure handling process in the local apparatus itself. CPU 103 then discards the job (S108). With such a construction, it is possible to schedule jobs and execute the facsimile re-transmission function based on the priorities and the registered times.

In the above embodiment, digital copying machines with facsimile functions are used as terminals. However, the terminals may be digital copying machines without facsimile functions. It is also possible to use apparatuses having a single function as terminals in the network, such as facsimile machines, image scanners, or printers. Multifunction facsimile machines, which can also be used as image reading apparatuses and printers, may also be used as terminals.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A client apparatus, connected to a plurality of server apparatuses in a network, to request a selected server apparatus of the plurality of server apparatuses to execute a job, the client apparatus comprising:

a function information requesting unit to request each of the plurality of server apparatuses to send information concerning its functions which can be provided;

a function information receiving unit to receive function information sent from each of the plurality of server apparatuses;

a guidance menu generating unit to generate a guidance menu based on the function information received by the function information receiving unit, wherein the guidance menu identifies each of the server apparatuses with their respective function information; and a displaying unit for displaying the guidance menu generated by the guidance menu generating unit.

2. A client apparatus in accordance with claim 1, further comprising:

a format information requesting unit to request. in response to a user selection, that a selected server apparatus send information on a format for requesting a job;

a format information receiving unit to receive job format information to request a job from the selected server apparatus; and a job requesting unit to request the selected server apparatus to execute a job, wherein the request by the job requesting unit conforms to the job format information received from the selected server apparatus.

3. A client apparatus in accordance with claim 2, wherein the function information requesting unit is adapted to further send a second request to each of the plurality of server apparatuses, wherein the second request requests each of the plurality of server apparatuses to send information on certain functions.

4. A network system including a plurality of server apparatuses and a client apparatus for requesting a server apparatus of the plurality of server apparatuses to execute a job, the network system comprising:

the client apparatus comprises, a function information requesting unit to transmit a first request requesting each of the plurality of server apparatuses to send information on its functions which can be provided;

a function information receiving unit to receive function information sent from each of the plurality of server apparatuses;

a guidance menu generating unit to generate a guidance menu based on the function information received by the function information receiving unit, wherein the guidance menu identifies each server apparatus of the plurality of server apparatuses with its corresponding functions; and a displaying unit for displaying the guidance menu generated by the guidance menu generating unit; and each of the plurality of server apparatuses comprises a function information sending unit to send function information corresponding to its respective functions in response to a first request from the client apparatus.

5. A network system in accordance with claim 4, wherein the client apparatus further comprises:

a format information requesting unit to request, in response to a user selection, that a selected server apparatus send format information for requesting a job;

a format information receiving unit to receive job format information to request a job from the selected server apparatus; and a job requesting unit to request the selected server apparatus to execute a job, wherein the request by the job requesting unit conforms to the format information received from the selected server apparatus; and each of the plurality of server apparatuses further comprises a format information sending unit to send job format information to the client apparatus in response to a request from the client apparatus.

6. A network system in accordance with claim 5, wherein the function information requesting unit is adapted to further send a second request, wherein the second request requests each of the plurality of server apparatuses to send information on certain functions, and wherein the function information sending unit, on receiving the first request, sends information on all functions which can be provided, and on receiving the second request, sends information on the certain functions to the client apparatus, if the certain functions can be provided.

7. A server apparatus, connected to at least one client apparatus through a network, for executing a job requested by a client apparatus, the server apparatus comprising:

a job management unit to manage jobs requested by the client apparatus by assigning a priority to each job each time a job is requested, wherein such priority is adapted to reflect circumstances in addition to a time of request; and a job controlling unit to identify and execute a job having a highest priority, wherein such identification occurs at prescribed intervals.

8. a server apparatus in accordance with claim 7, wherein the job management unit assigns a priority to each job according to a job type.

9. A server apparatus in accordance with claim 7, wherein the job controlling unit identifies a job having a highest priority at an interval equivalent to completion of a certain job unit.

10. A server apparatus in accordance with claim 7, wherein the job is a print job.

11. A server apparatus in accordance with claim 10, wherein the job controlling unit identifies a job having a highest priority at an interval equivalent to completion of a print job page.

12. A server apparatus in accordance with claim 7, wherein the job management unit further stores a status for each job, the status can indicate at least that a corresponding job is waiting to be executed, a corresponding job is being executed, or a corresponding job is suspended, wherein the job controlling unit identifies a job having a highest priority at prescribed intervals and, (i) if the job having the highest priority is waiting to be executed, the lob controlling unit suspends a currently executing job and executes the job having the highest priority, and (ii) executes the job having the highest priority immediately if there is no other job being executed, and wherein if a job is suspended, the lob controlling unit resumes the suspended job at a point at which the job was suspended.

13. A server apparatus in accordance with claim 12, wherein the job management unit further manages jobs by assigning a priority to selected jobs without regard to whether a selected job originated at the server or the at least one client.

14. A server apparatus in accordance with claim 7, wherein the server apparatus includes a copying portion and a facsimile portion.

15. A client apparatus, connected to a plurality of server apparatuses in a network, to request a selected server apparatus of the plurality of server apparatuses to execute a job, the client apparatus comprising:

a device adapted to request each of the plurality of server apparatuses to send information concerning its functional characteristic which can be provided, to receive the information sent from each of the plurality of server apparatuses, and to generate a guidance menu based on the information received by the function information receiving unit, wherein the guidance menu identifies each server apparatus and its corresponding functional characteristics; and a displaying unit for displaying the guidance menu generated by the guidance menu generating unit.

16. A client apparatus in accordance with claim 15, wherein in response to a selection of a server apparatus from the guidance menu, the device is further adapted to request the selected server apparatus return job format information and to receive job format information from the selected server apparatus.

17. A client apparatus in accordance with claim 16, wherein in response to receiving job format information from the selected server apparatus, the device is further adapted to request the selected server apparatus to execute a job, wherein such request conforms to the job format information received from the selected server apparatus.

18. A client apparatus in accordance with claim 15, wherein the device is further adapted to request each of the plurality of server apparatuses in the network to send information on certain functions.

19. A method of managing a plurality of server apparatuses, which are connected to at least one client through a network, and to enable a user to select a server apparatus to execute a job, the method comprising the steps of:

sending a request from a client to each of the plurality of server apparatuses, wherein the request seeks information concerning each function provided by each of the plurality of server apparatus;

receiving the function information from the plurality of server apparatuses;

generating a guidance menu based on the function information, wherein the guidance menu identifies each server apparatus with its corresponding function; and displaying the guidance menu generated by the guidance menu generating unit.

20. A method in accordance with claim 19, further comprising the steps of:

sending a second request from the client to a selected server apparatus, wherein the second request seeks information concerning job formatting information;

receiving the job formatting information from the selected server apparatus; and sending a third request from the client to the selected server apparatus, wherein the third request conforms to the job formatting information and requests the selected server apparatus to execute a job.

21. A method of managing a server apparatus, which is connected to at least one client through a network, to execute a job requested by a client apparatus, the method comprising the steps of:

assigning a priority to each job requested by a client apparatus, wherein such priority is adapted to reflect circumstances in addition to a time of request;

identifying a job having a highest priority; and executing the job having a highest priority, wherein the identifying step occurs at prescribed intervals.

* * * * *

UNITED STATES PATENT AND TRADEMARK OFFICE
CERTIFICATE OF CORRECTION

PATENT NO. : 6,130,757
DATED : October 10, 2000
INVENTOR(S) : Akinori Yoshida, et al.

It is certified that error appears in the above-identified patent and that said Letters Patent is hereby corrected as shown below:

On the title page, item: [75] Inventors:, the first line, after "Yoshida,", delete "Nishio;", and insert --Nishio-Shi;--.

The Front Page [75] Inventors:, the second line, after "Toyama,", delete "Toyokawa;", and insert --Toyokawa-Shi;--.

The Front Page [75] Inventors:, the second and third lines, after "Yonezu,", delete "Toyohashi,", and insert --Toyohashi-Shi,--.

Column 19, line 41, delete "(S102) .", and insert --(S102).--.

Column 19, line 43, after "(S103)", insert --.--.

Column 19, line 45 after "(S104),", delete ";".

UNITED STATES PATENT AND TRADEMARK OFFICE
CERTIFICATE OF CORRECTION

PATENT NO. : 6,130,757
DATED : October 10, 2000
INVENTOR(S) : Akinori Yoshida, et al.

It is certified that error appears in the above-identified patent and that said Letters Patent is hereby corrected as shown below:

Column 20, line 43 (claim 2, line 3), after "request", delete ".", and insert --,--.

Column 21, line 55 (claim 8, line 1), at the beginning of the sentence, delete "a", and insert --A--.

Column 22, line 10 (claim 12, line 10), delete "lob", and insert --job--.

Column 22, line 10 (claim 12, line 14), delete "lob", and insert --job--.

Signed and Sealed this

Eighth Day of May, 2001

Attest:

NICHOLAS P. GODICI

*Attesting Officer*   *Acting Director of the United States Patent and Trademark Office*